United States Patent
Cheng et al.

(10) Patent No.: US 12,501,241 B2
(45) Date of Patent: Dec. 16, 2025

(54) SENSING MODE CONFIGURATION FOR WIRELESS SENSING

(71) Applicant: QUALCOMM Incorporated, San Diego, CA (US)

(72) Inventors: Peng Cheng, Beijing (CN); Juan Zhang, Beijing (CN); Hao Xu, Beijing (CN); Chao Wei, Beijing (CN); Qiaoyu Li, Beijing (CN); Jing Dai, Beijing (CN); Min Huang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 18/044,968

(22) PCT Filed: Nov. 24, 2020

(86) PCT No.: PCT/CN2020/131069
§ 371 (c)(1),
(2) Date: Mar. 10, 2023

(87) PCT Pub. No.: WO2022/109772
PCT Pub. Date: Jun. 2, 2022

(65) Prior Publication Data
US 2023/0370820 A1 Nov. 16, 2023

(51) Int. Cl.
*H04W 4/38* (2018.01)
*H04W 8/22* (2009.01)

(52) U.S. Cl.
CPC ............... *H04W 4/38* (2018.02); *H04W 8/22* (2013.01)

(58) Field of Classification Search
CPC . H04W 24/10; H04W 24/08; H04W 36/0085; H04W 24/02; H04W 36/0088; H04W 36/0058; H04W 4/38; H04W 8/22
See application file for complete search history.

(56) References Cited

U.S. PATENT DOCUMENTS

| | | | |
|---|---|---|---|
| 9,485,683 B2 | 11/2016 | Chincholi et al. | |
| 2012/0142373 A1* | 6/2012 | Kazmi | H04W 24/08 |
| | | | 455/456.1 |
| 2016/0262036 A1* | 9/2016 | Shi | H04W 24/10 |

FOREIGN PATENT DOCUMENTS

| | | | | |
|---|---|---|---|---|
| CA | 3040355 A1 * | 4/2018 | ........... | H04B 7/0658 |
| CN | 101917731 A | 12/2010 | | |

(Continued)

OTHER PUBLICATIONS

International Search Report and Written Opinion—PCT/CN2020/131069—ISA/EPO—Aug. 13, 2021.

*Primary Examiner* — Dung Hong
(74) *Attorney, Agent, or Firm* — Holland & Hart LLP

(57) ABSTRACT

Methods, systems, and devices for wireless communications are described. A user equipment (UE) may receive, from a base station, a sensing configuration associated with a sensing mode, the sensing configuration indicating one or more parameter values that the UE is to use to perform sensing of objects within a detectable range of the UE, and the sensing configurating further indicating a format for providing a sensing report according to the sensing mode. The UE may receive one or more sensing waveforms based at least in part on the sensing configuration. The UE may transmit, to the base station according to the sensing mode, a sensing report indicating information associated with the one or more sensing waveforms.

27 Claims, 24 Drawing Sheets

(56) References Cited

FOREIGN PATENT DOCUMENTS

| CN | 103546888 A | | 1/2014 | | |
|---|---|---|---|---|---|
| CN | 108616346 A | * | 10/2018 | ........... | H04L 5/0057 |
| WO | WO-2015010282 A1 | * | 1/2015 | .......... | H04W 64/003 |
| WO | WO-2019062658 A1 | * | 4/2019 | ............ | H04W 24/10 |

* cited by examiner

SENSING MODE CONFIGURATION FOR WIRELESS SENSING

CROSS REFERENCE

The present application is a 371 national stage filing of International PCT Application No. PCT/CN2020/131069 by Cheng et al. entitled "SENSING MODE CONFIGURATION FOR WIRELESS SENSING," filed Nov. 24, 2020, which is assigned to the assignee hereof, and which is expressly incorporated by reference in its entirety herein.

FIELD OF TECHNOLOGY

The following relates to wireless communications, including sensing mode configuration for wireless sensing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support sensing mode configuration for wireless sensing. Generally, the described techniques provide for a user equipment (UE) to indicate its capability to support sensing operations to a sensing management function (which may be referred to as a SnMF or SMMF) within the core network via its serving cell. The UE may then be configured with one or more different sensing configurations, with each sensing configuration corresponding to, at least in part, a different format for a sensing report. The sensing configuration may identify the resources (e.g., time, frequency, spatial, etc., resources), the sensing target(s) (e.g., which object(s) are being sensed), the format for reporting the result of sensing the object(s), etc., that the UE will use to perform sensing operations. The UE may perform the sensing operations according to the sensing configuration. In a UE-based sensing mode, this may include the UE performing both the sensing measurements (determine radio frequency (RF) signal metrics, such as the measurement results) and/or performing the sensing computations (determine object parameter information based on the RF signal metrics). In a UE-assisted sensing mode, the UE may perform sensing measurements (e.g., determine the RF signal metrics), but the computation may be performed by the SnMF (e.g., the UE reports the RF signal metrics and the SnMF uses this to determine the object parameter information). In a network-based mode, the UE may perform the waveform transmissions (e.g., transmit one or more sensing waveforms) towards the object, but the base station may perform sensing measurements and/or computation. Accordingly, the UE may provide a sensing report based on a result of the sensing (e.g., indicating information associated with the sensing waveforms).

In some aspects, the sensing may be network initiated (e.g., initiated by the network node, such as the SnMF). For example, the SnMF may provide the sensing configuration for the UE by providing an indication of the sensing configuration to the base station serving the UE. The indication may correspond to the actual sensing configuration and/or may include a request to the base station for sensing operations by the UE. Similarly, the sensing report may be obtained from the UE (and/or base station in the network based sensing) via the serving base station. Moreover, the base station, in the UE assisted sensing mode, may receive the sensing waveforms transmitted by the UE and provide a sensing report to the network node (e.g., to the SnMF). Accordingly, aspects of the described techniques provide various mechanisms where the network may configure various sensing configurations to UE and/or base station.

A method for wireless communication at UE is described. The method may include receiving, from a base station, a sensing configuration associated with a sensing mode, the sensing configuration indicating one or more parameter values that the UE is to use to perform sensing of objects within a detectable range of the UE, and the sensing configurating further indicating a format for providing a sensing report according to the sensing mode, receiving one or more sensing waveforms based on the sensing configuration, and transmitting, to the base station according to the sensing mode, a sensing report indicating information associated with the one or more sensing waveforms.

An apparatus for wireless communication at UE is described. The apparatus may include a processor, memory in electronic communication with the processor, and instructions stored in the memory. The instructions may be executable by the processor to cause the apparatus to receive, from a base station, a sensing configuration associated with a sensing mode, the sensing configuration indicating one or more parameter values that the UE is to use to perform sensing of objects within a detectable range of the UE, and the sensing configurating further indicating a format for providing a sensing report according to the sensing mode, receive one or more sensing waveforms based on the sensing configuration, and transmit, to the base station according to the sensing mode, a sensing report indicating information associated with the one or more sensing waveforms.

Another apparatus for wireless communication at UE is described. The apparatus may include means for receiving, from a base station, a sensing configuration associated with a sensing mode, the sensing configuration indicating one or more parameter values that the UE is to use to perform sensing of objects within a detectable range of the UE, and the sensing configurating further indicating a format for providing a sensing report according to the sensing mode, means for receiving one or more sensing waveforms based on the sensing configuration, and means for transmitting, to the base station according to the sensing mode, a sensing report indicating information associated with the one or more sensing waveforms.

A non-transitory computer-readable medium storing code for wireless communication at UE is described. The code may include instructions executable by a processor to receive, from a base station, a sensing configuration associated with a sensing mode, the sensing configuration indicating one or more parameter values that the UE is to use to perform sensing of objects within a detectable range of the UE, and the sensing configurating further indicating a format for providing a sensing report according to the sensing mode, receive one or more sensing waveforms based on the sensing configuration, and transmit, to the base station according to the sensing mode, a sensing report indicating information associated with the one or more sensing waveforms.

Some examples of the method, apparatuses, and non-transitory computer-readable medium described herein may further include operations, features, means, or instructions for determining, based on the one or more sensing waveforms, radio frequency signal metrics associated with an object and determining, based on the radio frequency signal metrics associated with the object, one or more properties of the object, where the information associated with the one or more sensing waveforms indicated in the sensing report includes an indication of the one or more properties associated with the object.

Some examples of the method, apparatuses, and non-transitory computer-readable medium described herein may further include operations, features, means, or instructions for determining, based on the one or more sensing waveforms, radio frequency signal metrics associated with an object, where the information associated with the one or more sensing waveforms indicated in the sensing report includes an indication of the radio frequency signal metrics.

Some examples of the method, apparatuses, and non-transitory computer-readable medium described herein may further include operations, features, means, or instructions for receiving, from the base station and based on the radio frequency signal metrics, an indication of one or more properties of the object.

Some examples of the method, apparatuses, and non-transitory computer-readable medium described herein may further include operations, features, means, or instructions for receiving, from the base station, a request for a capability of the UE to perform the sensing of objects within the detectable range of the UE and transmitting, to the base station and based on the request, a UE capability message indicating the capability of the UE to perform sensing of objects within the detectable range of the UE, where the sensing configuration may be received based on the UE capability message.

Some examples of the method, apparatuses, and non-transitory computer-readable medium described herein may further include operations, features, means, or instructions for transmitting, to the base station, a request for assistance information and receiving, from the base station and based on the request, assistance information, the sensing report based on the assistance information.

Some examples of the method, apparatuses, and non-transitory computer-readable medium described herein may further include operations, features, means, or instructions for receiving, from the base station, a sensing result request message, where the sensing report may be transmitted based on the sensing result request message.

Some examples of the method, apparatuses, and non-transitory computer-readable medium described herein may further include operations, features, means, or instructions for transmitting, to the base station, a request for object parameter information associated with one or more objects, the object parameter information based on a corresponding one or more sensing reports the base station may have received from the UE, other UE, or both and receiving, from the base station and based on the request, the object parameter information.

Some examples of the method, apparatuses, and non-transitory computer-readable medium described herein may further include operations, features, means, or instructions for receiving, from the base station, a sensing service request for the UE to perform sensing of objects within the detectable range of the UE, where the sensing configuration may be received based on the sensing service request.

In some examples of the method, apparatuses, and non-transitory computer-readable medium described herein, the sensing configuration includes a first sensing configuration and the sensing mode includes a first sensing mode and the method, apparatuses, and non-transitory computer-readable medium may include further operations, features, means, or instructions for receiving, from the base station, a second sensing configuration associated with a second sensing mode and switching to sensing operations according to the second sensing mode based on receiving the second sensing configuration.

In some examples of the method, apparatuses, and non-transitory computer-readable medium described herein, the first sensing mode includes one of a UE-based sensing mode, a UE-assisted sensing mode, or a network-based sensing mode and the second sensing mode includes a different one of the UE-based sensing mode, the UE-assisted sensing mode, or the network-based sensing mode.

Some examples of the method, apparatuses, and non-transitory computer-readable medium described herein may further include operations, features, means, or instructions for receiving the sensing configuration from the base station may be based on a sensing service request from one or more sensing management network nodes within a core network associated with the base station.

A method for wireless communication at a network node is described. The method may include providing a sensing configuration for a UE, the sensing configuration associated with a sensing mode and indicating one or more parameter values that the UE is to use to perform sensing of objects within a detectable range of the UE, and the sensing configurating further indicating a format for providing a sensing report according to the sensing mode and obtaining, based on the transmitted sensing configuration, an indication of a sensing report from the UE that indicates information associated with the UE receiving one or more sensing waveforms reflected off of one or more sensed objects.

An apparatus for wireless communication at a network node is described. The apparatus may include a processor, memory in electronic communication with the processor, and instructions stored in the memory. The instructions may be executable by the processor to cause the apparatus to provide a sensing configuration for a UE, the sensing configuration associated with a sensing mode and indicating one or more parameter values that the UE is to use to perform sensing of objects within a detectable range of the UE, and the sensing configurating further indicating a format for providing a sensing report according to the sensing mode and obtain, based on the transmitted sensing configuration, an indication of a sensing report from the UE that indicates information associated with the UE receiving one or more sensing waveforms reflected off of one or more sensed objects.

Another apparatus for wireless communication at a network node is described. The apparatus may include means for providing a sensing configuration for a UE, the sensing configuration associated with a sensing mode and indicating one or more parameter values that the UE is to use to perform sensing of objects within a detectable range of the UE, and the sensing configurating further indicating a format for providing a sensing report according to the sensing mode and means for obtaining, based on the transmitted sensing configuration, an indication of a sensing report from the UE that indicates information associated with the UE receiving one or more sensing waveforms reflected off of one or more sensed objects.

A non-transitory computer-readable medium storing code for wireless communication at a network node is described. The code may include instructions executable by a processor to provide a sensing configuration for a UE, the sensing configuration associated with a sensing mode and indicating one or more parameter values that the UE is to use to perform sensing of objects within a detectable range of the UE, and the sensing configurating further indicating a format for providing a sensing report according to the sensing mode and obtain, based on the transmitted sensing configuration, an indication of a sensing report from the UE that indicates information associated with the UE receiving one or more sensing waveforms reflected off of one or more sensed objects.

In some examples of the method, apparatuses, and non-transitory computer-readable medium described herein, the information associated with the one or more sensing waveforms indicated in the sensing report includes an indication of one or more properties of an object.

In some examples of the method, apparatuses, and non-transitory computer-readable medium described herein, the information associated with the one or more sensing waveforms indicated in the sensing report includes an indication of radio frequency signal metrics associated with the one or more sensing waveforms.

Some examples of the method, apparatuses, and non-transitory computer-readable medium described herein may further include operations, features, means, or instructions for determining, based on the radio frequency signal metrics, one or more properties of an object and providing, for the UE, an indication of one or more properties of the object.

Some examples of the method, apparatuses, and non-transitory computer-readable medium described herein may further include operations, features, means, or instructions for providing, for the UE, a request for a capability of the UE to perform the sensing of objects within the detectable range of the UE and obtaining, from the UE and based on the request, a UE capability message indicating the capability of the UE to perform sensing of objects within the detectable range of the UE, where the sensing configuration may be provided for the UE based on the UE capability message.

Some examples of the method, apparatuses, and non-transitory computer-readable medium described herein may further include operations, features, means, or instructions for obtaining, from the UE, a request for assistance information message and providing, for the UE, assistance information in response to the request, the sensing report based on the assistance information.

Some examples of the method, apparatuses, and non-transitory computer-readable medium described herein may further include operations, features, means, or instructions for providing, for the UE, a sensing result request message, where the sensing report may be obtained based on the sensing result request message.

Some examples of the method, apparatuses, and non-transitory computer-readable medium described herein may further include operations, features, means, or instructions for obtaining, from the UE, a request for object parameter information associated with one or more objects, the object parameter information based on one or more sensing reports the network node may have received from the UE, other UE, or both, determining the object parameter information based on the one or more sensing reports, and providing, for the UE and based on the request, the object parameter information.

Some examples of the method, apparatuses, and non-transitory computer-readable medium described herein may further include operations, features, means, or instructions for providing, for the UE, a sensing service request for the UE to perform sensing of objects within the detectable range of the UE, where the sensing configuration may be provided for the UE based on the sensing service request.

In some examples of the method, apparatuses, and non-transitory computer-readable medium described herein, the sensing configuration includes a first sensing configuration and the sensing mode includes a first sensing mode and the method, apparatuses, and non-transitory computer-readable medium may include further operations, features, means, or instructions for providing, for the UE, a second sensing configuration associated with a second sensing mode, where the UE switches to sensing operations according to the second sensing mode based on the second sensing configuration.

In some examples of the method, apparatuses, and non-transitory computer-readable medium described herein, the first sensing mode includes one of a UE-based sensing mode, a UE-assisted sensing mode, or a network-based sensing mode and the second sensing mode includes a different one of the UE-based sensing mode, the UE-assisted sensing mode, or the network-based sensing mode.

A method for wireless communication at a base station is described. The method may include transmitting, to a UE, a sensing configuration associated with a sensing mode, the sensing configuration indicating one or more parameter values that the UE is to use to perform sensing of objects within a detectable range of the UE, receiving one or more sensing waveforms transmitted by the UE based on the sensing configuration, and transmitting, to a network node and according to the sensing mode, a sensing report indicating information associated with the one or more sensing waveforms.

An apparatus for wireless communication at a base station is described. The apparatus may include a processor, memory in electronic communication with the processor, and instructions stored in the memory. The instructions may be executable by the processor to cause the apparatus to transmit, to a UE, a sensing configuration associated with a sensing mode, the sensing configuration indicating one or more parameter values that the UE is to use to perform sensing of objects within a detectable range of the UE, receive one or more sensing waveforms transmitted by the UE based on the sensing configuration, and transmit, to a network node and according to the sensing mode, a sensing report indicating information associated with the one or more sensing waveforms.

Another apparatus for wireless communication at a base station is described. The apparatus may include means for transmitting, to a UE, a sensing configuration associated with a sensing mode, the sensing configuration indicating one or more parameter values that the UE is to use to perform sensing of objects within a detectable range of the UE, means for receiving one or more sensing waveforms transmitted by the UE based on the sensing configuration, and means for transmitting, to a network node and according to the sensing mode, a sensing report indicating information associated with the one or more sensing waveforms.

A non-transitory computer-readable medium storing code for wireless communication at a base station is described. The code may include instructions executable by a processor to transmit, to a UE, a sensing configuration associated with a sensing mode, the sensing configuration indicating one or more parameter values that the UE is to use to perform sensing of objects within a detectable range of the UE, receive one or more sensing waveforms transmitted by the UE based on the sensing configuration, and transmit, to a network node and according to the sensing mode, a sensing report indicating information associated with the one or more sensing waveforms.

Some examples of the method, apparatuses, and non-transitory computer-readable medium described herein may further include operations, features, means, or instructions for determining, based on the one or more sensing waveforms, radio frequency metrics associated with an object and determining, based on the radio frequency signal metrics associated with the object, one or more properties of the object, where the information associated with the one or more sensing waveforms indicated in the sensing report includes an indication of one or more properties of the object.

Some examples of the method, apparatuses, and non-transitory computer-readable medium described herein may further include operations, features, means, or instructions for determining, based on the one or more sensing waveforms, radio frequency signal metrics associated with an object, where the information associated with the one or more sensing waveforms indicated in the sensing report includes an indication of radio frequency signal metrics.

DETAILED DESCRIPTION

Figure 1:
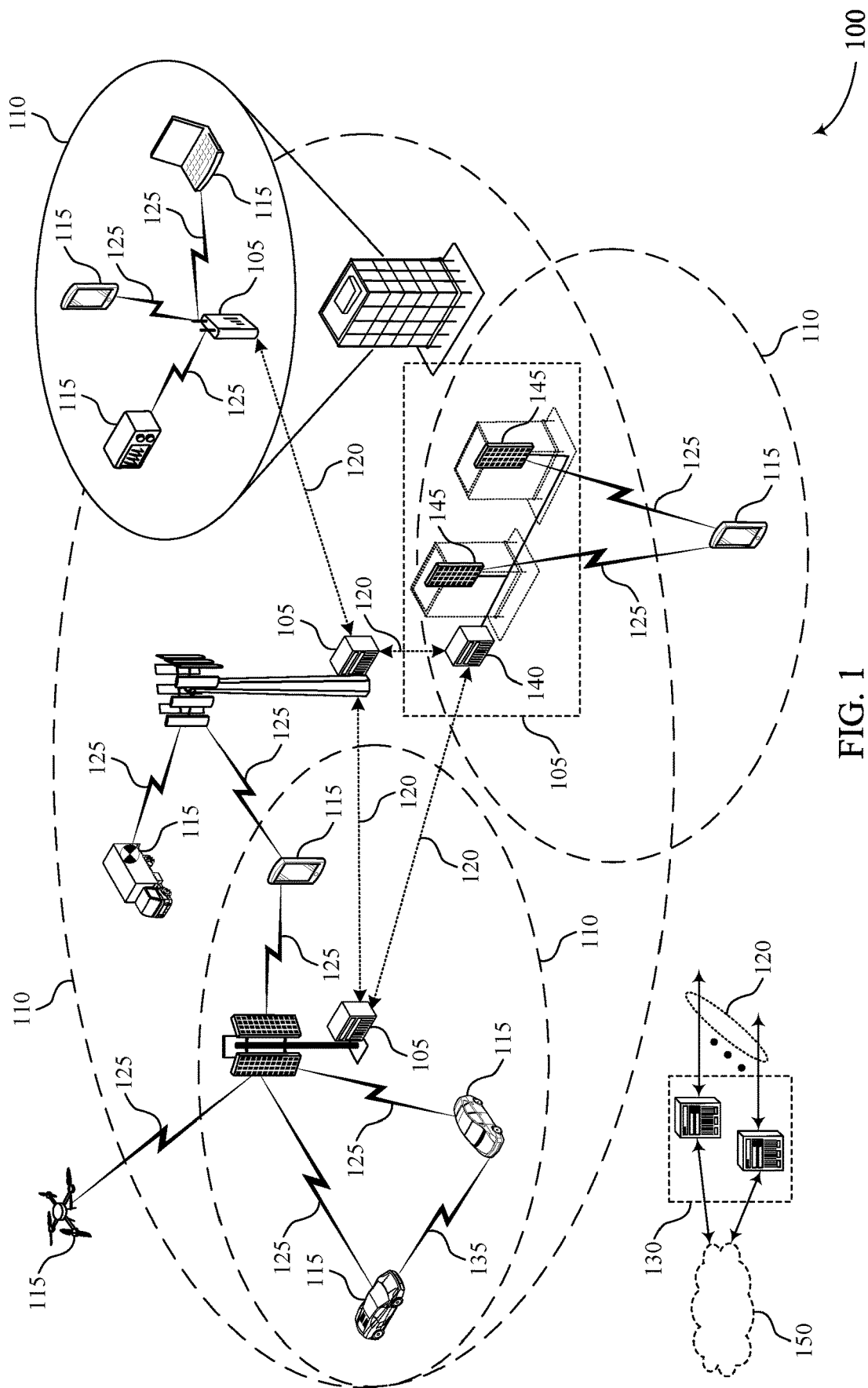
FIG. 1 illustrates an example of a system for wireless communications that supports sensing mode configuration for wireless sensing in accordance with aspects of the present disclosure.

Wireless sensing is expected to be a significant component of wireless communication systems. However, such sensing operations currently are not generally addressed in such wireless networks. For example, current wireless networks may not provide a mechanism, resources, etc., that can be used to configure different sensing operations by wireless devices within the wireless network. Accordingly, configuring resources for a user equipment (UE) to use for sensing is ad hoc in nature, and left up to implementation. This results in no dedicated resources, no configurations, or neither, being allocated to support sensing operations.

Aspects of the disclosure are initially described in the context of wireless communications systems. Generally, the described techniques provide for a UE to indicate its capability to support sensing operations to a sensing management function (which may be referred to as a SnMF or SMMF) within the core network via its serving cell. The UE may then be configured with one or more different sensing configurations, with each sensing configuration corresponding to, at least in part, a different format for a sensing report. The sensing configuration may identify the resources (e.g., time, frequency, spatial, etc., resources), the sensing target (s) (e.g., which object(s) are being sensed), the format for reporting the result of sensing the object(s), etc., that the UE will use to perform sensing operations. The UE may perform the sensing operations according to the sensing configuration. In a UE-based sensing mode, this may include the UE performing both the sensing measurements (determine radio frequency (RF) signal metrics, such as the measurement results) and/or performing the sensing computations (determine object parameter information based on the RF signal metrics). In a UE-assisted sensing mode, the UE may perform sensing measurements (e.g., determine the RF signal metrics), but the computation may be performed by the SnMF (e.g., the UE reports the RF signal metrics and the SnMF uses this to determine the object parameter information). In a network-based mode, the UE may perform the waveform transmissions (e.g., transmit one or more sensing waveforms) towards the object, but the base station may perform sensing measurements and/or computation. Accordingly, the UE may provide a sensing report based on a result of the sensing (e.g., indicating information associated with the sensing waveforms).

In some aspects, the sensing may be network initiated (e.g., initiated by the network node, such as the SnMF). For example, the SnMF may provide the sensing configuration for the UE by providing an indication of the sensing configuration to the base station serving the UE. The indication may correspond to the actual sensing configuration and/or may include a request to the base station for sensing operations by the UE. Similarly, the sensing report may be obtained from the UE (and/or base station in the network based sensing) via the serving base station. Moreover, the base station, in the UE assisted sensing mode, may receive the sensing waveforms transmitted by the UE and provide a sensing report to the network node (e.g., to the SnMF). Accordingly, aspects of the described techniques provide various mechanisms where the network may configure various sensing configurations to UE and/or base station.

Aspects of the disclosure are further illustrated by and described with reference to apparatus diagrams, system diagrams, and flowcharts that relate to sensing mode configuration for wireless sensing.

FIG. 1 illustrates an example of a wireless communications system 100 that supports sensing mode configuration for wireless sensing in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive, from a base station 105, an indication of a sensing configuration for the UE 115, the sensing configuration indicating one or more parameter values that the UE is to use to perform sensing of objects within a detectable range of the UE 115, and the sensing configuration further indicating a format for providing a sensing report. The UE 115 may receive one or more sensing waveforms based at least in part on the sensing configuration. The UE 115 may transmit, to the base station 105 according to the sensing configuration, a sensing report indicating information associated with the one or more sensing waveforms.

A network node (e.g., a node within core network 130, such as a SnMF, SMAS, etc.) may provide an indication of a sensing configuration for a UE 115, the sensing configuration indicating one or more parameter values that the UE 115 is to use to perform sensing of objects within a detectable range of the UE 115, and the sensing configuration further indicating a format for providing a sensing report. The network node may obtain, based at least in part on the transmitted sensing configuration, an indication of a sensing report from the UE 115 that indicates information associated with the UE 115 receiving one or more sensing waveforms reflected off of one or more sensed objects.

A base station 105 may transmit, to a UE 115, an indication of a sensing configuration for the UE 115, the sensing configuration indicating one or more parameter values that the UE 115 is to use to perform sensing of objects within a detectable range of the UE 115. The base station 105 may receive one or more sensing waveforms transmitted by the UE 115 based at least in part on the sensing configuration. The base station 105 may transmit, to a network node and according to the sensing configuration, a sensing report indicating information associated with the one or more sensing waveforms.

Figure 2:
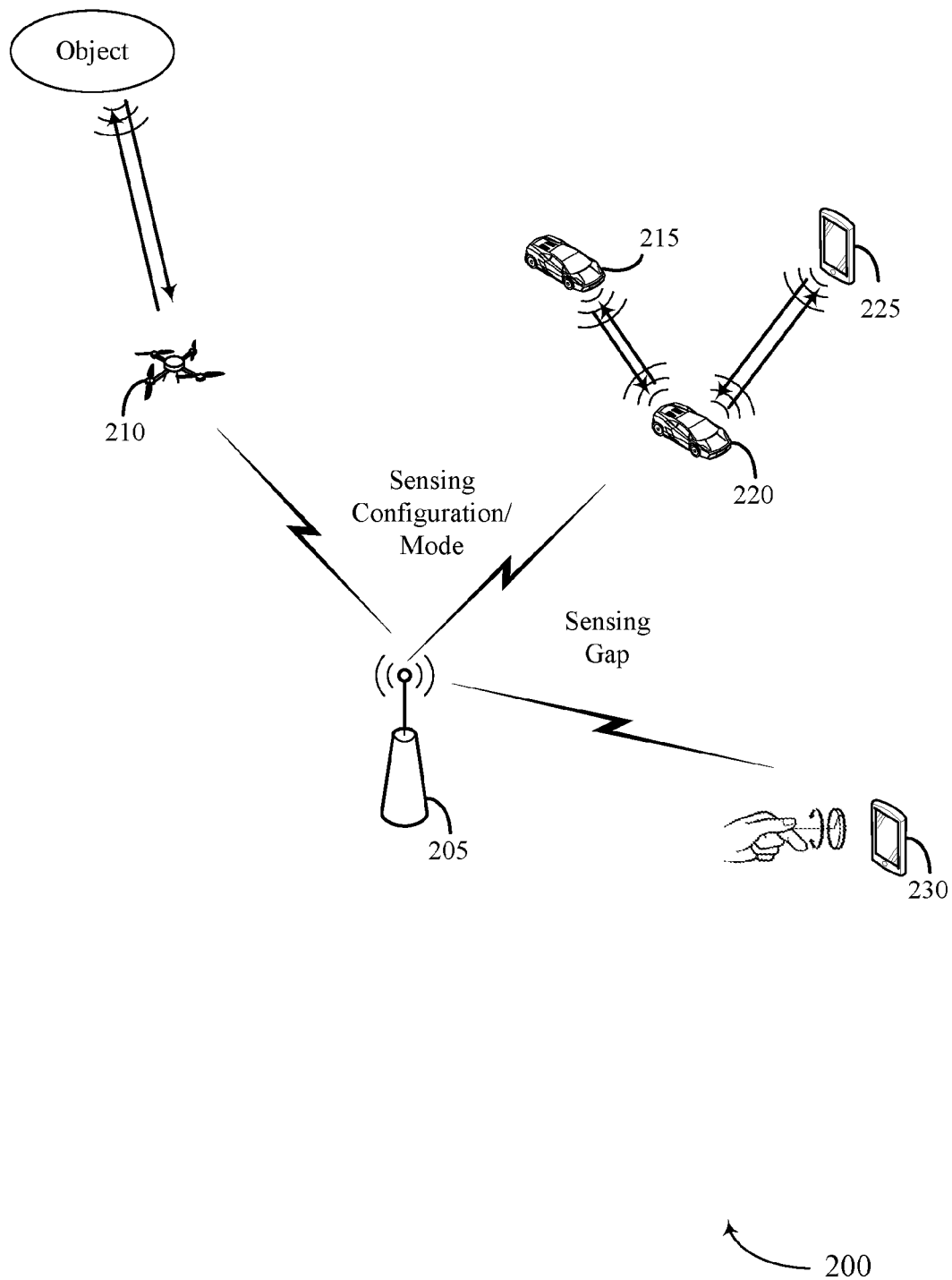
FIG. 2 illustrates an example of a wireless communication system that supports sensing mode configuration for wireless sensing in accordance with aspects of the present disclosure.

FIG. 2 illustrates an example of a wireless communication system 200 that supports sensing mode configuration for wireless sensing in accordance with aspects of the present disclosure. In some examples, wireless communication system 200 may implement aspects of wireless communication system 100. Wireless communication system 200 may include base station 205, UE 210, UE 215, UE 220, UE 225, and/or UE 230, which may be examples of the corresponding devices described herein.

RF sensing applications (e.g., utilizing one or more sensing waveforms) may provide valuable information. Example RF sensing applications include, but are not limited to, health monitoring (e.g., heartbeat detection/tracking, respiration rate monitoring, etc.), contextual information acquisition (e.g., location detection/tracking, direction finding, range tracking, etc.), automotive RADAR and/or light detection and ranging (LiDAR) (e.g., smart cruise control, collision avoidance, etc.), and the like. RF sensing applications may be on the centimeter scale (e.g., sensing human activity, such as gesture recognition), used for moving object detection (e.g., vehicle/pedestrian detection/quantification in a C-V2X network), and the like. Furthermore, RF sensing applications in a NR radio frequency spectrum band may provide wider bandwidth for a higher frequency band (e.g., greater than 52 GHz). RF sensing applications using NR hardware may also be beneficial due to massive antenna arrays/configurations, enhanced RF capabilities (e.g., beamforming techniques, multiple transmit receive chains, etc.), and the like.

RF sensing applications may be performed according to different scenarios. In one scenario, the RF sensing application may be implemented alone by the UEs within the wireless network (e.g., such as UE 230 using RF sensing applications to detect and quantify gesture recognition). This RF sensing application may be one example of a UE based sensing mode/configuration. Another scenario may include one or more base stations (such as implemented in a road-side unit (RSU)) within a V2X network) performing RF sensing (e.g., detecting/quantifying vehicles/pedestrians). Another scenario may include multiple UEs (such as UE 215, UE 220, and/or UE 225) detecting/quantifying vehicles/pedestrians. Another scenario may include UEs and/or base stations applying RF sensing applications to an object (e.g., such as UE 210 performing RF sensing of an object that might not otherwise have wireless capabilities, such as a building). Accordingly, RF sensing applications may include wireless devices supporting RF sensing alone (e.g., stand-alone sensing, such as gesture recognition), RF sensing with at least some degree of assistance from base station 205 and/or the network, and/or RF sensing plus data transmissions (e.g., applications within a V2X network).

Accordingly, higher frequencies (e.g., mmW and THz frequency ranges) may provide a higher bandwidth and larger aperture to extract accurate range/doppler/angle information for the environment imaging using RF sensing applications. Such higher frequencies may provide such features in a compact form factor, which would be applicable for mobile devices, such as UEs. This may lead to handheld RADAR and/or LIDAR devices becoming prevalent in some applications. For example, some devices may use the dedicated radar sensor(s) (e.g., Google's Soli RADAR chip) for gesture classification. Another example may include a radar short range device for in-car-based control (e.g., Texas Instrument's short range RADAR).

RF sensing application solutions may be summarized into three blocks. The first block may correspond to the sensing waveform (e.g., a sensing chip sends RADAR signals with a pre-defined waveform, such as a frequency modulated continuous wave (FMCW) waveform, a pulse waveform, etc.), which may also be considered the sensing waveform (s). The second block may correspond to RADAR signal processing (RSP) techniques (e.g., the reflected signals (Rx) are correlated with transmitted (Tx) signals to determine the range, doppler, angle information, etc.), which may correspond to receiving the sensing waveforms where such range, doppler, angle information, etc., are determined and which may correspond to the RF signal metrics associated with the sensing waveforms. The third block may correspond to machine learning (e.g., the classification, regression and artificial intelligent (AI) agent for the designed actions), which may correspond to determining object property information for object(s) based on the reflected sensing waveforms.

That is, aspects of the RF signal transmission (e.g., sensing waveforms) and the RF signal reflected off of the sensed object as received by the wireless node may constitute RF signal metrics associated with the object. For example, transmit timing, transmit frequency, transmit power, transmit direction (e.g., angle of departure (AoD), location/position of the transmitter, speed of the transmitter, direction of travel of the transmitter, and the like, corresponding to the transmitted sensing waveforms may constitute at least a portion of the RF signal metrics associated with the object/sensing waveforms. Similarly, receive timing, receive frequency, receive power, receive direction (e.g., angle of arrival (AoA), location of the receiver, speed of the receiver, direction of travel of the receiver, and the like, corresponding to the reflections of the sensing waveforms off of the sensed object may constitute another portion of the RF signal metrics associated with the object/sensing waveforms, which may also be a part of the RF signal metrics. The RF signal metrics associated with an object may be utilized, processed, etc., to determine various properties of the object (e.g., object property information). For example, such properties may include, but are not limited to, the location of the object, the size of the object, the shape of the object, the characteristics of the object, movement of the object, speed of the object, direction of travel of the object, and the like. Some examples of the characteristics of the object include, but are not limited to, movement of at least a portion of the object, orientation of the object, changes with respect to some portion(s) or all of the object, and the like.

In some aspects, RF sensing applications may be downlink waveform based sensing, e.g., AP sensing, which may also be applicable to base station based sensing. For example, the AP may configure the downlink signals for sensing (e.g., configure one or more sensing waveforms). The AP may use the RF sensing application to image the environment, localize gamers in a virtual reality (VR) setting, etc. Additionally, the AP may communicate with the gamers for data transmission. In some aspects, RF sensing applications may be uplink waveform based sensing, e.g., UE sensing. For example, the UE may transmit the sensing signal (e.g., the one or more sensing waveforms). The sensing signals may be used by the UE for sensing facial interactions, gestures, etc. In some aspects, the RF sensing application may be sidelink based sensing, e.g., vehicle sensing in a V2X network. For example, a UE (e.g., a vehicle-based UE, such as UE 215 and/or UE 220) transmits the sensing signal (e.g., the sensing waveforms) to measure the range of adjacent objects (e.g., other vehicles, pedestrians, objects, etc.). The UE may also communicate with the other wireless nodes, e.g., for data transmission in the V2X network.

As discussed, the lack of support for such RF sensing may eliminate the ability to leverage a deployed cellular wireless communication system to support RF sensing applications. That is, wireless communication systems are currently not equipped to support RF sensing techniques, beyond more than in an ad hoc/implementation specific manner. This may limit the ability to develop mapping information (e.g., an environmental picture, a 3D map, tracking information within a factory setting, situational awareness information for the vehicle-based wireless communication system, etc.). This may lead to reduced optimizations within a wireless communication system due to unknown objects interfering with wireless communications, obstructing movement of wireless nodes (and associated vehicles, users, etc.), and the like. This may also eliminate the ability to identify, track, or otherwise monitor object(s) proximate to wireless nodes of the radio access network (RAN). In the context of a V2X network, this may result in collisions between vehicles and/or pedestrians.

Accordingly, aspects of the described techniques provide various mechanisms that permit configuring the UE with one or more sensing configurations to support RF sensing applications within wireless communication system 200. Aspects of the described techniques may be implemented at and/or implemented by a network node, such as a SnMF, a sensing management application server (SMAS), and the like (not shown). For example, the network node may provide a sensing configuration for a UE to use for RF sensing. The network node may provide the sensing configuration for the UE via one or more other network nodes (e.g., an AMF within the core network) and/or the serving base station of the UE. Broadly, the sensing configuration may indicate or otherwise identify resources (e.g., reference signal resources or other resources/resource parameters to be used for transmission of the sensing waveforms) used for RF sensing, a format for the sensing report associated with the RF sensing applications, and the like. In some aspects, the sensing configuration may identify or otherwise indicate information associated with the RF sensing applications (e.g., the type of sensing configuration/mode, the nature of the object(s) being sensed, and the like. For example, the sensing configuration may indicate that RF sensing applications are to be performed more generally and/or may indicate which object(s) are to be sensed.

Example of the sensing configurations/modes include, but are not limited to, a UE based sensing configuration/mode, a UE assisted sensing configuration/mode, a network based sensing configuration/mode, and the like. Accordingly, the UE may receive the sensing configuration from its serving base station/cell (e.g., base station 205) provided via the SnMF and/or SMAS, and implement RF sensing applications according to the sensing configuration/mode. Depending on the particular sensing configuration/mode, the UE may transmit or otherwise provide a sensing report indicating information associated with the sensing waveforms transmitted using the sensing resources identified in the sensing configuration.

In a UE based sensing configuration/mode, this may include the UE transmitting the one or more sensing waveforms, receiving the reflections of the one or more sensing waveforms off of the sensed object(s), measuring the received sensing waveforms to determine RF signal metrics, and then quantifying the sensed object by using the RF signal metrics to determine the object property information. In this configuration/mode, the UE may transmit a sensing report indicating the properties associated with the object. That is, the UE based mode may include the UE performing the sensing measurements and computation of the sensing results (with or without assistance from the SnMF or other network node) and reporting the sensing results to the sensing server (e.g., the SnMF and/or SMAS via its serving base station/cell). In this sensing configuration/mode, the UE may configure the sensing report to identify or otherwise indicate the properties associated with the sensed object. The UE may use the RF signal metrics determined based on transmitting and/or receiving the sensing waveforms (e.g., transmit power, transmit direction, AoD, receive power, receive direction, AoA, etc.) to identify, determine, or otherwise quantify the properties of the sensed object(s).

In the UE assisted sensing configuration/mode, the UE may transmit the sensing waveforms, receive the reflections of the sensing waveforms off of the sensed object, and use the received sensing waveforms to determine the RF signal metrics associated with the sensing waveforms/sensed object(s). In this configuration/mode, the UE may transmit a sensing report indicating the RF signal metrics associated with the sensing waveforms. That is, the UE assisted mode may include the UE performing the sensing measurements (with or without assistance information from the SnMF or other network node), and reporting the sensing measurements to the sensing server (e.g., SnMF and/or SMAS), which computes the sensing results (e.g., identifies/quantifies the properties associated with the sensed object(s) based on the RF signal metrics).

In the network based sensing configuration/mode, the UE may transmit the sensing waveforms, but base station 205 may receive the reflections of the one or more sensing waveforms off of the sensed object(s) and measure the received sensing waveforms to determine the RF signal metrics. In one example, base station 205 may identify and/or quantify the sensed object(s) by using the RF signal metrics to determine the object property information. In another example, base station 205 may not perform the sensing computations, but may, instead, send the sensing report to the SnMF and/or SMAS, which performs the sensing measurements to identify/quantify the sensed object (s) based on the RF signal metrics. In this sensing configuration/mode, base station 205 may transmit a sensing report indicating the RF signal metrics and/or the properties associated with the object. That is, the network based mode may include base station 205 performing sensing measurements and/or computation of the sensing signals (e.g., the sensing waveforms) transmitted by a UE (with or without assistance information from the sensing server). Base station 205 may report the RF signal metrics and/or object properties to the sensing server (e.g., SnMF and/or SMAS), which may compute the sensing results (e.g., when base station 205 signals the RF signal metrics in the sensing report). Whether or not base station 205 performs the sensing computation may be based on several factors, e.g., based on implementation, based on base station load, the extent of the sensing computations, etc. The UE assisted and/or network based sensing configurations/modes may be utilized in order to save power/processing costs at the UE (e.g., to avoid the UE having to perform the sensing measurements and/or computations).

In some aspects, the sensing configurations/modes may be implemented together. For example, one UE may report its sensing measurements (e.g., the RF signal metrics) and/or sensing computations (e.g., the object property information) to the sensing server (e.g., SnMF), base station 205 may report the RF signal metrics and/or object properties as part of environmental/contextual sensing, and so forth. The SnMF may stitch the sensing reports together to determine or otherwise identify a complete view of the environment/context. The stitched results may also be referred to as a fused sensing result and may provide a more comprehensive understanding of the environment/context. Aspects of the described techniques supporting RF sensing applications may be applied to a public safety system, a commercial system, and the like.

Accordingly, the UE may receive the sensing configuration from base station 205 (provided by the SnMF and/or SMAS), initiate the RF sensing applications according to the sensing configuration, and provide the sensing report to the SnMF via base station 205 in a format consistent with the sensing configuration. The SnMF and/or SMAS may utilize sensing reports received from UE(s) and/or base station(s) to perform sensing computations. For example, the SnMF may utilize the different sensing reports to identify/quantify aspects of object(s) located proximate to the UE(s) and/or base station(s).

Figure 3:
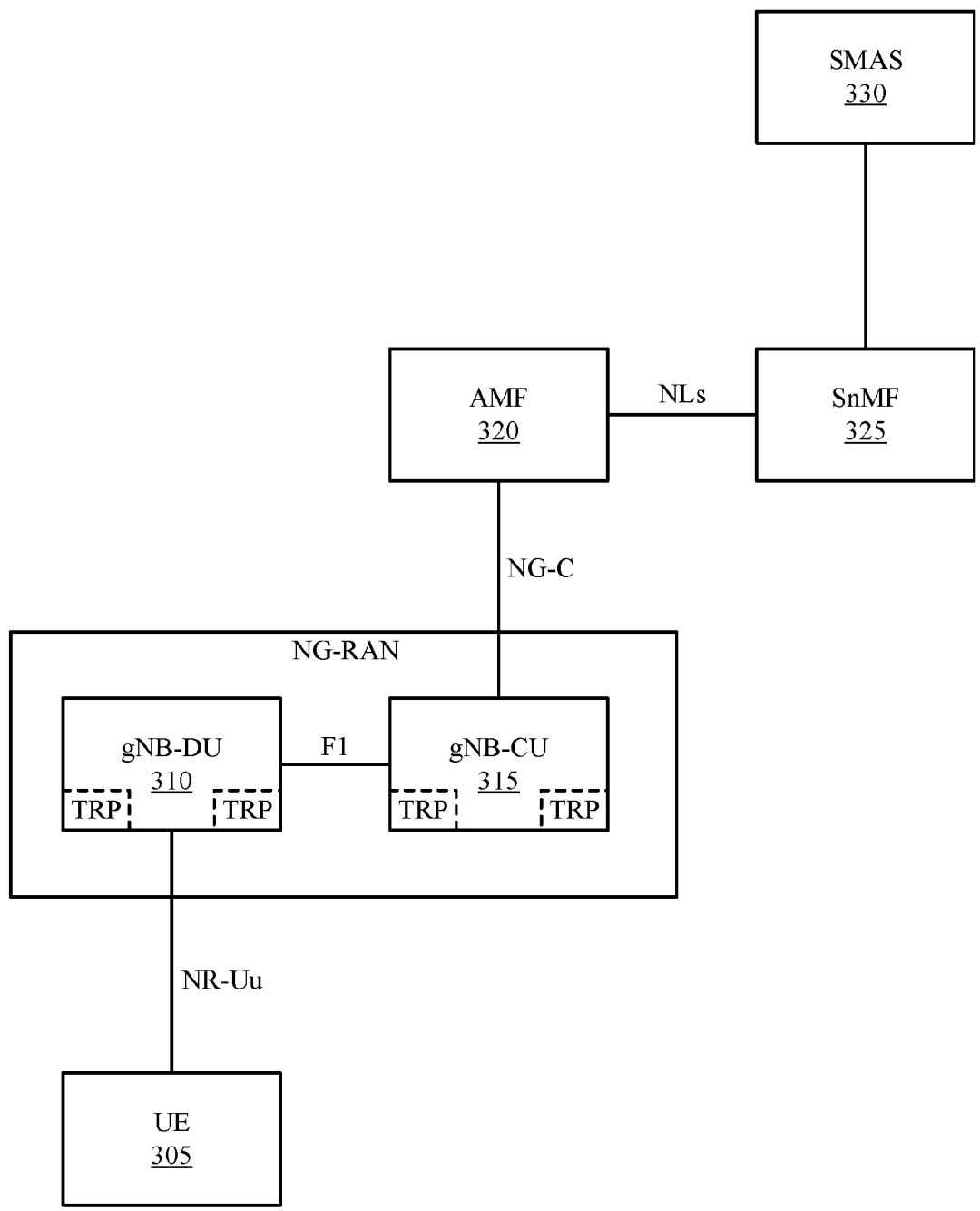
FIG. 3 illustrates an example of a architecture that supports sensing mode configuration for wireless sensing in accordance with aspects of the present disclosure.

FIG. 3 illustrates an example of an architecture 300 that supports sensing mode configuration for wireless sensing in accordance with aspects of the present disclosure. In some examples, architecture 300 may implement aspects of wireless communication systems 100 and/or 200. Architecture 300 may include UE 305, gNB-DU 310, gNB-CU 315, access and mobility management function (AMF) 320, SnMF 325, and/or SMAS 330, which may be examples of the corresponding devices described herein. Generally, AMF 320, SnMF 325, and/or SMAS 330 may be components within a core network, such as a 5G-NR. Generally, gNB-DU 310 and gNB-CU 315 may be components of one or more base stations.

Broadly, architecture 300 illustrates one non-limiting example of an architecture that may be deployed to support the described RF sensing application techniques. For example, SnMF 325 and/or SMAS 330 may be may be deployed within a core network to support, at least to some degree, aspects of different sensing configurations/modes being configured for wireless nodes to support RF sensing applications.

SnMF 325 may generally be deployed within the core network of the wireless communication system that monitors, controls, or otherwise manages, various aspects of RF sensing. In some examples, this may include SnMF 325 processing the RF signal metrics and/or object property information associated with one or more objects that are received from various wireless nodes of the RAN (e.g., such as gNB-DU 310 and/or gNB-CU 315 as well as any of the UEs within the network). When sensing report(s) indicate RF signal metrics associated with sensing waveforms/object (s), SnMF 325 may identify or otherwise determine the properties of the object based on the RF signal metrics. SnMF 325 may transmit or otherwise provide an indication of the properties of the object(s) to SMAS 330, which uses this information to identify or otherwise determine mapping information for the object(s)/environment/contextual information, e.g., which may be part of larger mapping operation within the wireless communication system.

In some aspects, SnMF 325 and/or SMAS 330 may be implemented in hardware and/or software within the core network. SnMF 325 and/or SMAS 330 may be implemented as independent/separate component(s)/function(s) within the core network and/or may be combined with one or more other component(s)/function(s) within the core network, such as being combined within a location and tracking management function (LMF). SnMF 325 and/or SMAS 330 may operate as service-based component(s) within the core network and the interaction between SnMF 325 and other core network functions may be a service-based representation and/or a reference point representation. For example, the service based representation may include the network functions (e.g., SnMF 325, SMAS 330, LMF, AMF 320, etc.) within the control plane enabling other authorized network functions to access their services (which may include point-to-point reference points where necessary). The reference point representation may include the interaction existing between the network function services in the network functions described as point-to-point reference points (e.g., N11) between any two network functions (e.g., interface NLs between SnMF 325 and AMF 320 and/or SMAS 330). Accordingly, SnMF 325 may communicate with SMAS 330 via one or more interfaces within the core network, e.g., a service based interface, such as an $N_{SMAS}$ interface, an Nsnmf interface, an Namf interface, and/or a reference point interface, such as an N5 interface, an N11, interface, an NLs interface, an N14 interface, an N2 interface (e.g., when obtaining RF signal metrics from wireless nodes of the RAN), and the like. In some aspects, an existing interface may be utilized for communications/coordination between SnMF 325 and other core network functions and/or a new interface (e.g., an Nsnmf interface) may be created for communications/coordination between SnMF 325 and other core network functions of the core network, such as SMAS 330. Accordingly, references to SnMF 325 and/or other network functions providing, obtaining, etc., may generally refer to information transmitted or otherwise conveyed via any interface between the various network entities.

gNB-DU 310 and/or gNB-CU 315 may, alone or in combination, may be a part of the 5G RAN and may also be referred to as a base station(s). Each gNB may be associated with one or more TRPs, with two TRPs being shown by way of example only. Generally, gNB-DU 310 may correspond to a distributed unit (DU) and gNB-CU 315 may correspond to a central unit (CU) of the 5G RAN. In this CU-DI split, the gNBs (e.g., the gNB consisting of a combination of gNB-CU 315 and one or more gNB-DUs 310) may be interconnected with each other via an Xn interface. The gNBs may be connected to the 5G core network (5G-C) via NG interfaces, e.g., the NG-C interface. Specifically, gNBs may be connected to AMF 320 via an N2 (NG-C) interface and to a User Plane Function (UPF) via an N3 (NG-U) interface. As discussed, the gNB (e.g., the base station) may consist of a CU (e.g., gNB-CU 315) and one or more DUs (e.g., gNB-DU 310) connected to the CU via F1 and/or Fs-C/Fs-U interfaces for control plane and user plane, respectively. The split architecture may enable the 5G network to utilize different distribution of protocol stacks between CU and DUs depending on fronthaul (FH) availability and network design criteria.

In some aspects, SMAS 330 may be a part of the 5G RAN (e.g., a component deployed by the cell operator) and/or may be a third party server (e.g., a server deployed by a separate party, but interfacing with SnMF 325. For example, SMAS 330 and/or SnMF 325 may request UE 305 and/or the base station (e.g., gNB-CU 315 and/or gNB 310) to perform and report sensing measurements. SMAS 330 and/or SnMF 325 may perform sensing computations (e.g., calculate the sensing results based on the reported local sensing measurements from UE 305 and/or the base station). SMAS 330 and/or SnMF 325 may fuse sensing results from multiple UEs/gNBs together to get a complete view of the environment/context. In some examples, SMAS 330 and/or SnMF 325 may send the sensing results back to UE 305 and/or the base station.

Accordingly, SnMF 325 and/or SMAS 330 may transmit, indicate, or otherwise provide an indication for UE 305 (e.g., via gNB-CU 315 and/or gNB-DU 310) of a sensing configuration. The sensing configuration may carry or otherwise convey an indication of parameter value(s) that UE 305 is to use to perform sensing of objects within a detectable range of UE 305. The sensing configuration may also carry or otherwise convey an indication of the format for providing a sensing report based on the RF sensing application.

In the UE based sensing configuration/mode and/or the UE assisted sensing configuration/mode, UE 305 may receive the sensing configuration and transmit sensing waveform(s) using the sensing configuration. For example, UE 305 may identify the resources/parameter values indicated in the sensing configuration to generate the sensing waveforms for transmission. UE 305 may monitor for and receive the sensing waveforms reflected off of sensed object(s). UE 305 may perform sensing measurement of the received sensing waveform(s) to identify or otherwise determine the RF signal metrics associated with the sensing waveform(s) and/or the sensed object(s). For example, UE 305 may measure aspects of the received sensing waveform(s) and compare those measurements with the transmitted sensing waveforms. Differences in the transmitted and received sensing waveforms may be used to determine the RF signal metrics. In the UE assisted sensing configuration/mode, UE 305 may transmit the sensing report according to the sensing configuration to carry or otherwise convey an indication of the RF signal metrics. In the UE based sensing configuration/mode, UE 305 may use the RF signal metrics to identify or otherwise determine properties of the sensed object(s). That is, UE 305 may use the RF signal metrics to identify and/or otherwise quantify various aspects of the sensed object(s). In this configuration/mode, the sensing report may carry or otherwise convey an indication of the RF signal metrics and/or the properties associated with the object.

In the network based sensing mode, UE 305 may receive the sensing configuration/mode and generate/transmit the sensing waveforms according to the sensing configuration. However, in this configuration/mode gNB-DU 310 may perform the sensing measurements and/or sensing computations. For example, gNB-DU 310 may receive the sensing waveforms reflected off of the sensed object(s). As gNB-DU 310 knows the sensing configuration, this provides an indication of the parameter values used by UE 305 to transmit the sensing waveform(s). Accordingly, gNB-DU 310 may compare the measurements of the received sensing waveforms to the transmitted sensing waveforms to identify or otherwise determine the RF signal metrics associated with the sensing waveforms and/or the sensed object(s). In some examples, gNB-DU 310 may perform the sensing computations and use the RF signal metrics to identify or otherwise determine the properties associated with the object. Accordingly, gNB-DU 310 may transmit or otherwise provide a sensing report to SnMF 325 and/or SMAS 330 indicating the RF signal metrics and/or the object properties.

Accordingly, the SnMF 325 and/or SMAS 330 may obtain the sensing report(s) from UEs and/or base station(s) and, when the RF signal metrics are indicated in the sensing report(s), identify or otherwise determine the properties associated with the sensed object(s).

Figure 4:
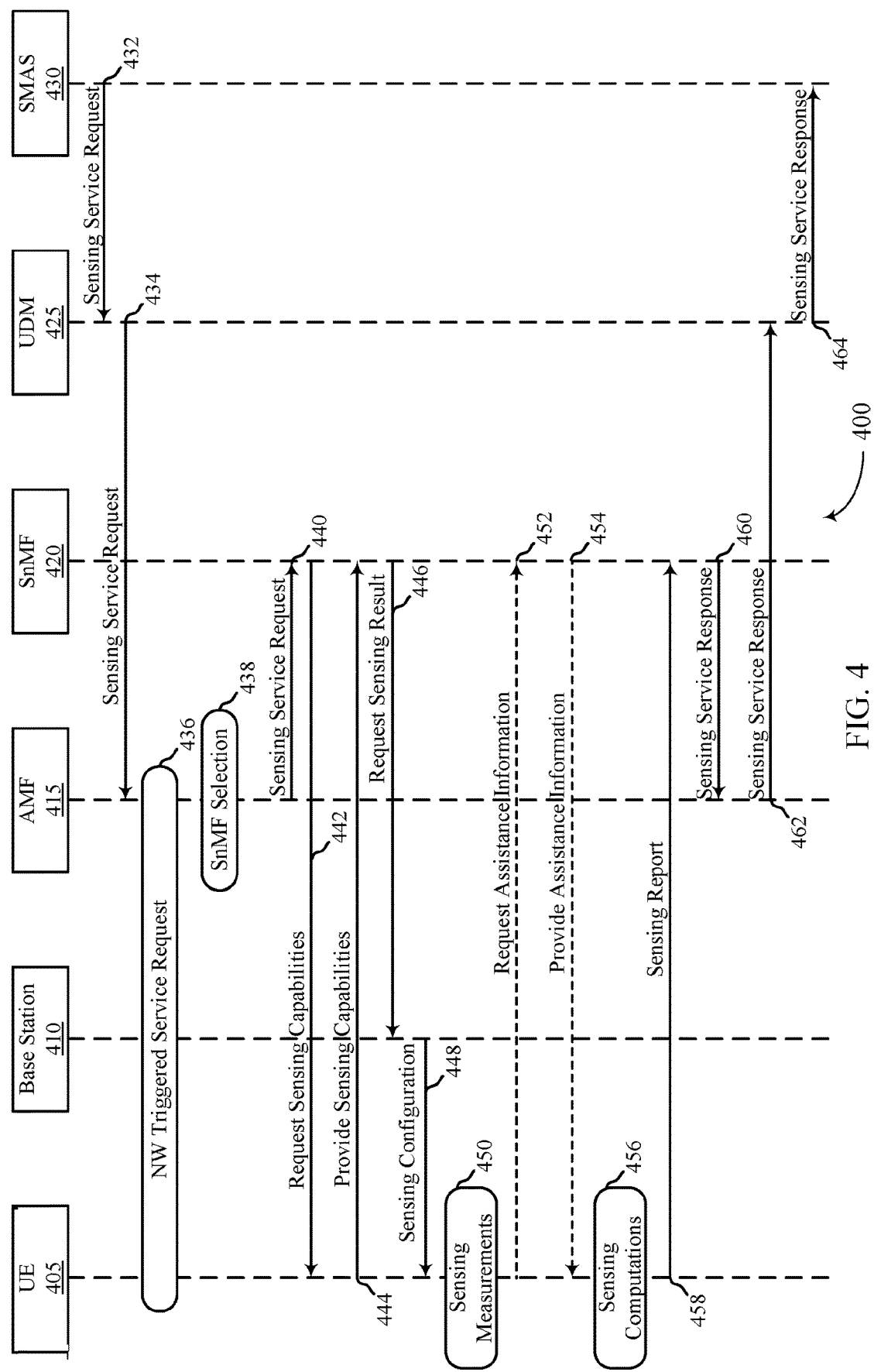
FIG. 4 illustrates an example of a process that supports sensing mode configuration for wireless sensing in accordance with aspects of the present disclosure.

FIG. 4 illustrates an example of a process 400 that supports sensing mode configuration for wireless sensing in accordance with aspects of the present disclosure. In some examples, process 400 may implement aspects of wireless communication systems 100 and/or 200, and/or architecture 300. Aspects of process 400 may be implemented at and/or implemented by UE 405, base station 410, AMF 415, SnMF 420, unified data management (UDM) 425, and/or SMAS 430, which may be examples of the corresponding devices described herein. Broadly, process 400 illustrates an example of a UE based sensing configuration/mode.

At 432, SMAS 430 may transmit or otherwise provide (and UDM 425 may receive or otherwise obtain) a sensing service request. For example, when SMAS 430 is a part of a commercial system (e.g., a third party server), SMAS 430 may send the sensing service request to UDM 425 for a privacy check (as shown). Otherwise, SMAS 430 may send the sensing service request directly to AMF 415 when SMAS 430 is deployed as part of the RAN (not shown).

At 434 and in the commercial system example discussed above, UDM 425 may perform the privacy check on the sensing service request and, if passed, transmit or otherwise provide (and AMF 415 may receive or otherwise obtain) the sensing service request. Broadly, the sensing service request may initiate RF sensing applications.

Accordingly and at 436, the network triggered sensing service request may be initiated between UE 405, base station 410, and/or AMF 415. In response and at 438, AMF 415 may perform SnMF selection to identify or otherwise determine the SnMF server within the core network that will be associated with the sensing service request. In the non-limiting example illustrated in process 400, AMF 415 may select SnMF 420 to support the sensing service request. That is, AMF 415 may perform SnMF selection upon receipt of the sensing service request message from UDM 425 and/or SMAS 430.

Accordingly and at 440, AMF 415 may transmit or otherwise provide (and SnMF 420 may receive or otherwise obtain) the sensing service request. Broadly, the sensing service request may carry or otherwise convey an indication that RF sensing applications are to be performed. The sensing service request may identify or otherwise convey an indication of the sensing configuration/mode associated with the RF sensing applications. The sensing service request may indicate a specific type of sensing to be performed (e.g., identify the object(s) to be sensed, sensing configuration/mode to be utilized for the RF sensing applications, and the like) and/or may indicate a more generic request for RF sensing applications to be performed. In some aspects, the RF sensing applications may be based on the capabilities of UE 405.

For example and at 442, SnMF 420 may transmit or otherwise provide (and UE 405 may receive or otherwise obtain) a request for sensing capability. For example, the capability request may carry or otherwise convey an indication of a request for which sensing configurations/modes are supported by UE 405 (and/or base station 410, in some examples).

At 444, UE 405 may respond by transmitting or otherwise providing (and SnMF 420 may receive or otherwise obtain) a UE capability message indicating the capability of UE 410 to perform sensing of objects within a detectable range of UE 405. For example, UE 405 (and base station 410 in some examples) may indicate generically whether it supports RF sensing applications and/or may indicate particular sensing configurations/modes that are supported. Accordingly, SnMF 420 may trigger a sensing capability check procedure with UE 405 and/or base station 410. In the non-limiting example illustrated in process 400, the UE capability message may indicate that the UE 405 and/or base station 410 are configured to support RF sensing applications, at least according to the UE based sensing configuration/mode.

At 446, SnMF 420 may transmit or otherwise provide (and base station 410 may receive or otherwise obtain) a request for a sensing result. That is, SnMF 420 may request sensing to base station 410. In response and at 448, base station 410 may transmit or otherwise provide (and UE 405 may receive or otherwise obtain) the sensing configuration indicating one or more parameter values that UE 405 is to use to perform sensing of objects within a detectable range of UE 405. The sensing configuration may also provide or otherwise convey an indication of a format for sensing report. That is, base station 410 may configure UE 405 for sensing (e.g., indicate the reference signal or other signals to be used for wireless sensing (e.g., define the sensing waveforms), indicate the sensing measurement configuration, and/or the sensing report format).

At 450, UE 405 may perform sensing measurements. That is, UE 405 may generate and transmit sensing waveforms toward object(s) within the detectable range of UE 405 according to the sensing configuration. UE 405 may receive sensing waveforms reflected off of sensed object(s). UE 405 may therefore compare parameter values of the received sensing waveforms with the parameter values of the transmitted sensing waveforms. Based on the comparison, UE 405 may identify or otherwise determine RF signal metrics associated with the sensing waveforms and/or sensed objects.

In some aspects, UE 405 may optionally request assistance from SnMF 420. For example, at 452 UE 405 may optionally transmit or otherwise provide (and SnMF 420 may receive or otherwise obtain) request for assistance information. Generally, the request may carry or otherwise convey a request for any information that may be helpful when performing sensing measurements and/or computations. For example, the request for assistance information may include a request for any known information regarding objects within a particular area, a request for any known information regarding specific objects (e.g., any location information, known object property information, and the like), and so forth. In response and at 454, SnMF 420 may optionally transmit or otherwise provide (and UE 405 to receive or otherwise obtain) the assistance information. That is, SnMF 20 may provide the assistance information requested by UE 405, as appropriate and when available.

At 456, UE 405 may perform sensing computations. That is, UE 405 may use the RF signal metrics determined based on the sensing measurements to identify properties associated with the object(s) being sensed. When provided, UE 405 may utilize some or all of the assistance information received from SnMF 420 during the sensing computations.

At 458, UE 405 may transmit or otherwise provide (and SnMF 420 may receive or otherwise obtain) a sensing report. For example, UE 405 may transmit the sensing report to base station 410, which may provide the sensing report to SnMF 420. The format for the sensing report may be based on the sensing configuration. For example, the sensing report may carry or otherwise convey an indication of the RF signal metrics and/or the properties associated with the object.

At 460, SnMF 420 may transmit or otherwise provide (and AMF 415 may receive or otherwise obtain) the sensing service response (e.g., the response to the sensing service request provided at 440). In some aspects, the sensing service response may carry or otherwise convey the indication of the RF signal metrics and/or the properties associated with the object. At 462, AMF 415 may transmit or otherwise provide (and UDM 425 may receive or otherwise obtain) the sensing service response. In the example illustrated in process 400, UDM 425 may forward the sensing service response to SMAS 430 at 464, e.g., for privacy verification. However, in the non-commercial deployment scenario, AMF 415 may provide the sensing service response directly to SMAS 430 (not shown). Accordingly, UE 405 may report the sensing results to SnMF 420, which forwards the sensing results to AMF 415, which finally forwards the sensing results to SMAS 430. SMAS 430 may use the sensing report, along with other sensing reports, to determine a more comprehensive geographical map and/or other contextual information based on the RF sensing applications.

Figure 5:
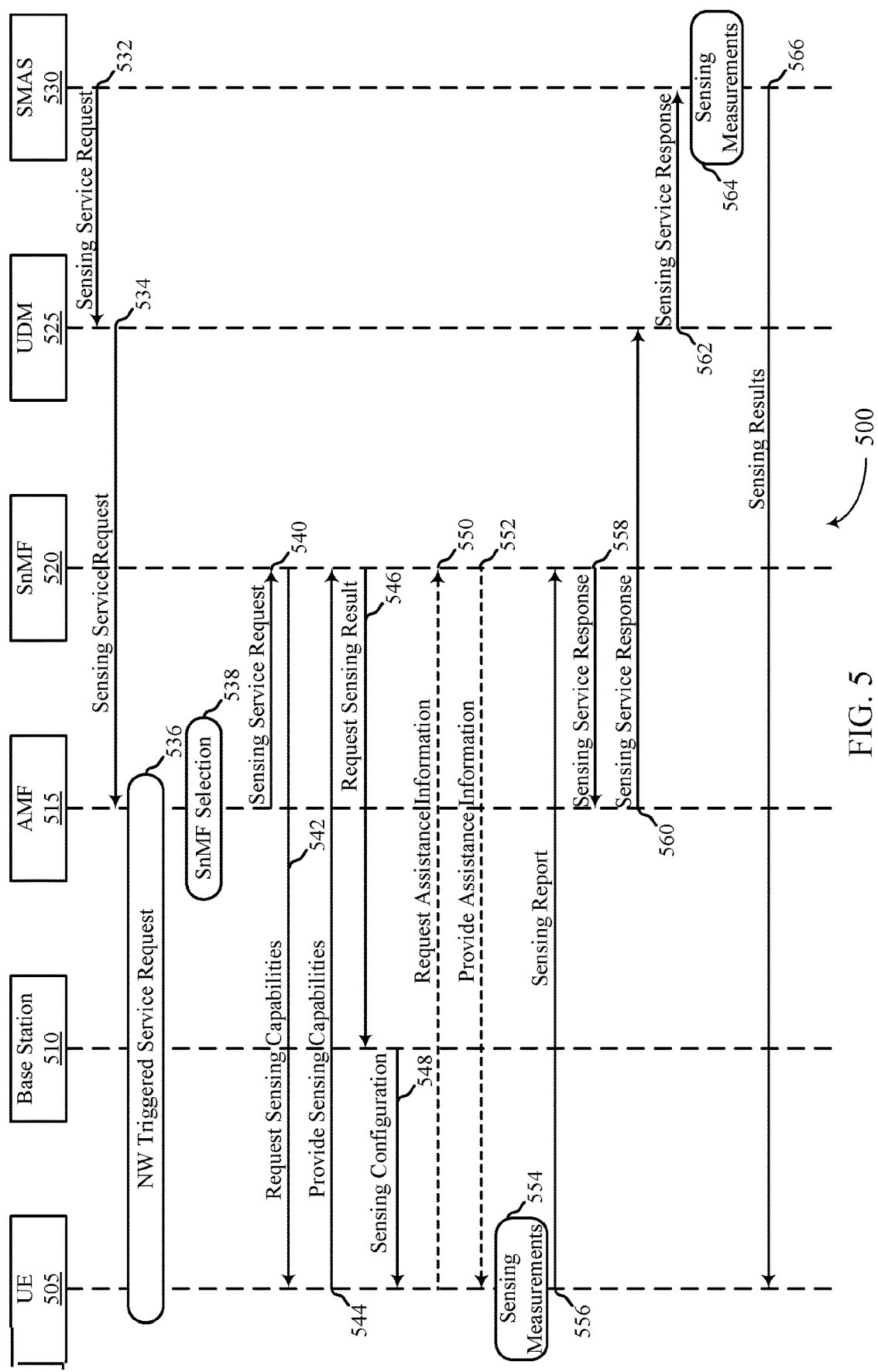
FIG. 5 illustrates an example of a process that supports sensing mode configuration for wireless sensing in accordance with aspects of the present disclosure.

FIG. 5 illustrates an example of a process 500 that supports sensing mode configuration for wireless sensing in accordance with aspects of the present disclosure. In some examples, process 500 may implement aspects of wireless communication systems 100 and/or 200, architecture 300, and/or process 400. Aspects of process 500 may be implemented at and/or implemented by UE 505, base station 510, AMF 515, SnMF 520, UDM 525, and/or SMAS 530, which may be examples of the corresponding devices described herein. Broadly, process 500 illustrates an example of a UE assisted sensing configuration/mode.

At 532, SMAS 530 may transmit or otherwise provide (and UDM 525 may receive or otherwise obtain) a sensing service request. For example, when SMAS 530 is a part of a commercial system (e.g., a third party server), SMAS 530 may send the sensing service request to UDM 525 for a privacy check (as shown). Otherwise, SMAS 530 may send the sensing service request directly to AMF 515 when SMAS 530 is deployed as part of the RAN (not shown).

At 534 and in the commercial system example discussed above, UDM 525 may perform the privacy check on the sensing service request and, if passed, transmit or otherwise provide (and AMF 515 may receive or otherwise obtain) the sensing service request. Broadly, the sensing service request may initiate RF sensing applications.

Accordingly and at 536, the network triggered sensing service request may be initiated between UE 505, base station 510, and/or AMF 515. In response and at 538, AMF 515 may perform SnMF selection to identify or otherwise determine the SnMF server within the core network that will be associated with the sensing service request. In the non-limiting example illustrated in process 500, AMF 515 may select SnMF 520 to support the sensing service request. That is, AMF 515 may perform SnMF selection upon receipt of the sensing service request message from UDM 525 and/or SMAS 530.

Accordingly and at 540, AMF 515 may transmit or otherwise provide (and SnMF 520 may receive or otherwise obtain) the sensing service request. Broadly, the sensing service request may carry or otherwise convey an indication that RF sensing applications are to be performed. The sensing service request may identify or otherwise convey an indication of the sensing configuration/mode associated with the RF sensing applications. The sensing service request may indicate a specific type of sensing to be performed (e.g., identify the object(s) to be sensed, sensing configuration/mode to be utilized for the RF sensing applications, and the like) and/or may indicate a more generic request for RF sensing applications to be performed. In some aspects, the RF sensing applications may be based on the capabilities of UE 505.

For example and at 542, SnMF 520 may transmit or otherwise provide (and UE 505 may receive or otherwise obtain) a request for sensing capability. For example, the capability request may carry or otherwise convey an indication of a request for which sensing configurations/modes are supported by UE 505 (and/or base station 510, in some examples).

At 544, UE 505 may respond by transmitting or otherwise providing (and SnMF 520 may receive or otherwise obtain) a UE capability message indicating the capability of UE 510 to perform sensing of objects within a detectable range of UE 505. For example, UE 505 (and base station 510 in some examples) may indicate generically whether it supports RF sensing applications and/or may indicate particular sensing configurations/modes that are supported. Accordingly, SnMF 520 may trigger a sensing capability check procedure with UE 505 and/or base station 510. In the non-limiting example illustrated in process 500, the UE capability message may indicate that the UE 505 and/or base station 510 are configured to support RF sensing applications, at least according to the UE assisted sensing configuration/mode.

At 546, SnMF 520 may transmit or otherwise provide (and base station 510 may receive or otherwise obtain) a request for a sensing result. That is, SnMF 520 may request sensing to base station 510. In response and at 548, base station 510 may transmit or otherwise provide (and UE 505 may receive or otherwise obtain) the sensing configuration indicating one or more parameter values that UE 505 is to use to perform sensing of objects within a detectable range of UE 505. The sensing configuration may also provide or otherwise convey an indication of a format for sensing report. That is, base station 510 may configure UE 505 for sensing (e.g., indicate the reference signal or other signals to be used for wireless sensing (e.g., define the sensing waveforms), indicate the sensing measurement configuration, and/or the sensing report format).

In some aspects, UE 505 may optionally request assistance from SnMF 520. For example, at 550 UE 505 may optionally transmit or otherwise provide (and SnMF 520 may receive or otherwise obtain) request for assistance information. Generally, the request may carry or otherwise convey a request for any information that may be helpful when performing sensing measurements, in this example. For example, the request for assistance information may include a request for any known information regarding objects within a particular area, a request for any known information regarding specific objects (e.g., any location information, known RF signal metrics associated with sensed object(s), any known object property information, and the like), and so forth. In response and at 552, SnMF 520 may optionally transmit or otherwise provide (and UE 505 to receive or otherwise obtain) the assistance information. That is, SnMF 520 may provide the assistance information requested by UE 505, as appropriate and when available.

At 554, UE 505 may perform sensing measurements. That is, UE 505 may generate and transmit sensing waveforms toward object(s) within the detectable range of UE 505 according to the sensing configuration. UE 505 may receive sensing waveforms reflected off of sensed object(s). UE 505 may therefore compare parameter values of the received sensing waveforms with the parameter values of the transmitted sensing waveforms. Based on the comparison, UE 505 may identify or otherwise determine RF signal metrics associated with the sensing waveforms and/or sensed objects. When provided, UE 505 may use some or all of the assistance information when performing sensing measurements.

At 556, UE 505 may transmit or otherwise provide (and SnMF 520 may receive or otherwise obtain) a sensing report. For example, UE 505 may transmit the sensing report to base station 510, which may provide the sensing report to SnMF 520. The format for the sensing report may be based on the sensing configuration. For example, the sensing report may carry or otherwise convey an indication of the RF signal metrics associated with the sensing waveforms and/or sensed object(s).

At 558, SnMF 520 may transmit or otherwise provide (and AMF 515 may receive or otherwise obtain) the sensing service response (e.g., the response to the sensing service request provided at 540). In some aspects, the sensing service response may carry or otherwise convey the indication of the RF signal metrics received in the sensing report. At 560, AMF 515 may transmit or otherwise provide (and UDM 525 may receive or otherwise obtain) the sensing service response. In the example illustrated in process 500, UDM 525 may forward the sensing service response to SMAS 530 at 562, e.g., for privacy verification. However, in the non-commercial deployment scenario, AMF 515 may provide the sensing service response directly to SMAS 530 (not shown). Accordingly, UE 505 may report the sensing measurements (e.g., the RF signal metrics) to SnMF 520, which forwards the sensing measurements to AMF 515, which finally forwards the sensing results to SMAS 530.

At 564, SMAS 530 may perform sensing computations. That is, SMAS 530 may use the RF signal metrics reported in the sensing report and based on the sensing measurements to identify properties associated with the object(s) being sensed. SMAS 530 may use the sensing report, along with other sensing reports, to determine a more comprehensive geographical map and/or other contextual information based on the RF sensing applications.

At 566, SMAS 530 may transmit or otherwise provide (and UE 505 may receive or otherwise obtain) the sensing results. The sensing results may include an indication of the properties associated with the sensed object(s) corresponding to the sensing report and/or may correspond to more comprehensive geographical and/or contextual information. SMAS 530 may transmit the sensing results to UE 505 via the AMF 515, SnMF 520, base station 510, and the like. Accordingly, one difference between the UE based sensing configuration/mode and the UE assisted sensing configuration/mode is that UE 505 does not need to perform sensing computation on sensing measurements, e.g., to save power.

Figure 6:
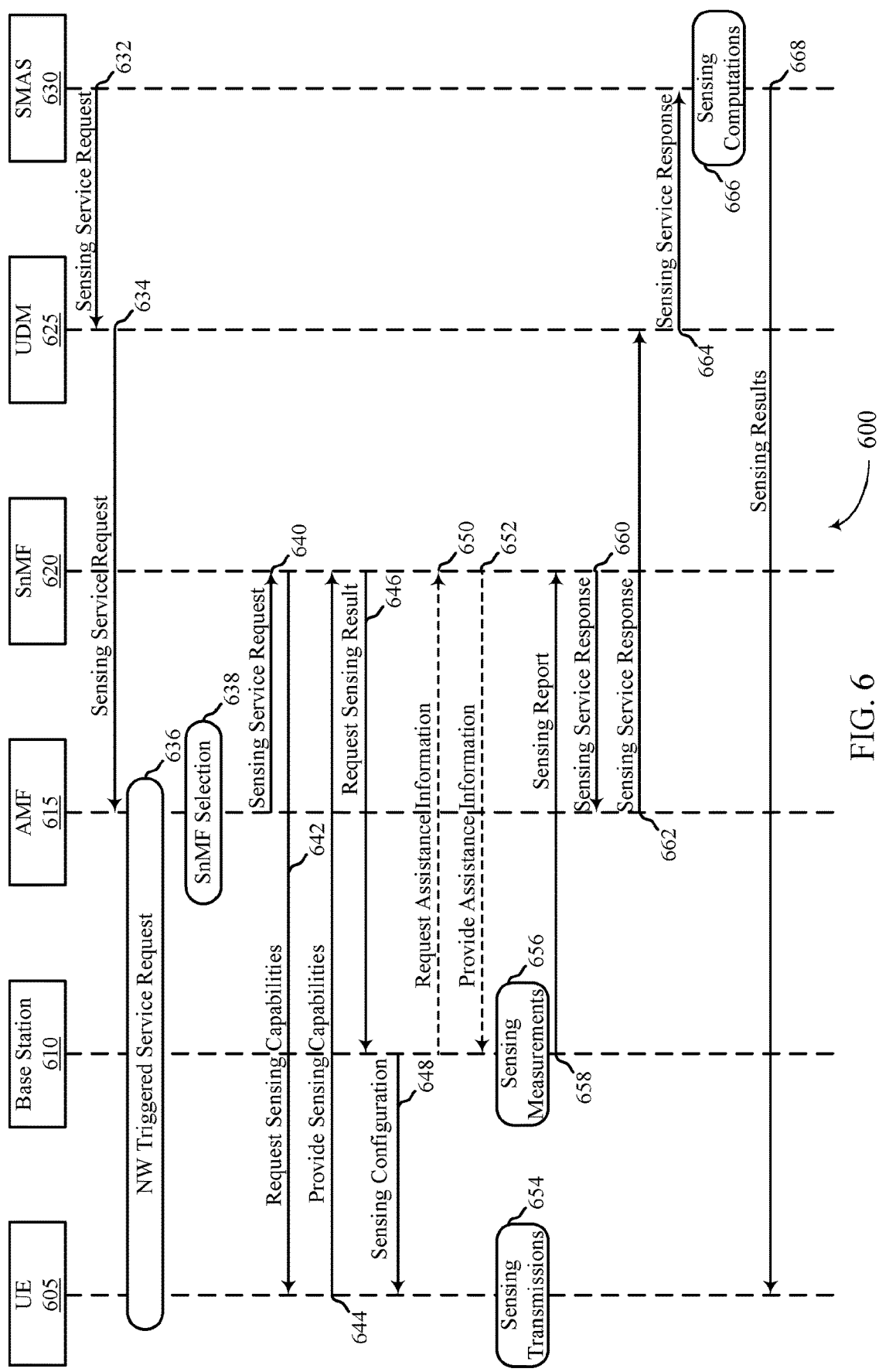
FIG. 6 illustrates an example of a process that supports sensing mode configuration for wireless sensing in accordance with aspects of the present disclosure.

FIG. 6 illustrates an example of a process 600 that supports sensing mode configuration for wireless sensing in accordance with aspects of the present disclosure. In some examples, process 600 may implement aspects of wireless communication systems 100 and/or 200, architecture 300, and/or processes 400 and/or 500. Aspects of process 600 may be implemented at and/or implemented by UE 605, base station 610, AMF 615, SnMF 620, UDM 625, and/or SMAS 630, which may be examples of the corresponding devices described herein. Broadly, process 600 illustrates an example of a network based sensing configuration/mode.

At 632, SMAS 630 may transmit or otherwise provide (and UDM 625 may receive or otherwise obtain) a sensing service request. For example, when SMAS 630 is a part of a commercial system (e.g., a third party server), SMAS 630 may send the sensing service request to UDM 625 for a privacy check (as shown). Otherwise, SMAS 630 may send the sensing service request directly to AMF 615 when SMAS 630 is deployed as part of the RAN (not shown).

At 634 and in the commercial system example discussed above, UDM 625 may perform the privacy check on the sensing service request and, if passed, transmit or otherwise provide (and AMF 615 may receive or otherwise obtain) the sensing service request. Broadly, the sensing service request may initiate RF sensing applications.

Accordingly and at 636, the network triggered sensing service request may be initiated between UE 605, base station 610, and/or AMF 615. In response and at 638, AMF 615 may perform SnMF selection to identify or otherwise determine the SnMF server within the core network that will be associated with the sensing service request. In the non-limiting example illustrated in process 600, AMF 615 may select SnMF 620 to support the sensing service request. That is, AMF 615 may perform SnMF selection upon receipt of the sensing service request message from UDM 625 and/or SMAS 630.

Accordingly and at 640, AMF 615 may transmit or otherwise provide (and SnMF 620 may receive or otherwise obtain) the sensing service request. Broadly, the sensing service request may carry or otherwise convey an indication that RF sensing applications are to be performed. The sensing service request may identify or otherwise convey an indication of the sensing configuration/mode associated with the RF sensing applications. The sensing service request may indicate a specific type of sensing to be performed (e.g., identify the object(s) to be sensed, sensing configuration/mode to be utilized for the RF sensing applications, and the like) and/or may indicate a more generic request for RF sensing applications to be performed. In some aspects, the RF sensing applications may be based on the capabilities of UE 605.

For example and at 642, SnMF 620 may transmit or otherwise provide (and UE 605 may receive or otherwise obtain) a request for sensing capability. For example, the capability request may carry or otherwise convey an indication of a request for which sensing configurations/modes are supported by UE 605 (and/or base station 610, in some examples).

At 644, UE 605 may respond by transmitting or otherwise providing (and SnMF 620 may receive or otherwise obtain) a UE capability message indicating the capability of UE 605 to perform sensing of objects within a detectable range of UE 605. For example, UE 605 (and base station 610 in some examples) may indicate generically whether it supports RF sensing applications and/or may indicate particular sensing configurations/modes that are supported. Accordingly, SnMF 620 may trigger a sensing capability check procedure with UE 605 and/or base station 610. In the non-limiting example illustrated in process 600, the UE capability message may indicate that the UE 605 and/or base station 610 are configured to support RF sensing applications, at least according to the network based sensing configuration/mode.

At 646, SnMF 620 may transmit or otherwise provide (and base station 610 may receive or otherwise obtain) a request for a sensing result. That is, SnMF 620 may request sensing to base station 610. In response and at 648, base station 610 may transmit or otherwise provide (and UE 605 may receive or otherwise obtain) the sensing configuration indicating one or more parameter values that UE 605 is to use to perform sensing of objects within a detectable range of UE 605. The sensing configuration may also provide or otherwise convey an indication of a format for sensing report. That is, base station 610 may configure UE 605 for sensing (e.g., indicate the reference signal or other signals to be used for wireless sensing (e.g., define the sensing waveforms), indicate the sensing measurement configuration, and/or the sensing report format). In the network based sensing configuration/mode, the sensing configuration may indicate the parameter values that UE 610 is to use to perform transmission of the sensing waveforms.

In some aspects, base station 610 may optionally request assistance from SnMF 620. For example, at 650 base station 610 may optionally transmit or otherwise provide (and SnMF 620 may receive or otherwise obtain) request for assistance information. Generally, the request may carry or otherwise convey a request for any information that may be helpful when performing sensing measurements and/or sensing computations. For example, the request for assistance information may include a request for any known information regarding objects within a particular area, a request for any known information regarding specific objects (e.g., any location information, known RF signal metrics associated with sensed object(s), any known object property information, and the like), and so forth. In response and at 652, SnMF 620 may optionally transmit or otherwise provide (and base station 610 may receive or otherwise obtain) the assistance information. That is, SnMF 620 may provide the assistance information requested by base station 610, as appropriate and when available.

At 654, UE 605 may perform sensing transmissions. That is, UE 605 may generate and transmit sensing waveforms toward object(s) within the detectable range of UE 605 according to the sensing configuration. However, in the network based sensing configuration/mode, base station 610 may perform sensing measurements and/or sensing computations.

For example and at 656, base station 610 may receive sensing waveforms reflected off of sensed object(s). Base station 610 may therefore compare parameter values of the received sensing waveforms with the parameter values of the transmitted sensing waveforms (as indicated in the sensing configuration provided to UE 605). Based on the comparison, base station 610 may identify or otherwise determine RF signal metrics associated with the sensing waveforms and/or sensed objects. When provided, base station 610 may use some or all of the assistance information when performing sensing measurements.

In the non-limiting example illustrated in process 600, base station 610 does not perform sensing computations.

The determination of whether or not base station 610 will perform sensing computations may depend on base station 610 implementation. In one example, base station 610 may perform sensing computation (e.g., determine the properties associated with the sensed object(s) based on the sensing signaling of UE 610. For example, base station 610 may configure (e.g., via the sensing configuration) UE 605 to transmit sounding reference signal(s) (SRS)(s), special reference signals, or other waveforms as the sensing waveforms). Base station 610 may perform sensing computations based on the sensing waveforms transmitted by UE 605. In another example, this may be based on the sensing signaling of base station 610. For example, network implementation may determine how another base station may send the sensing waveforms for sensing and how base station 610 may perform the sensing measurements and/or computations.

Accordingly and at 658, base station 610 may transmit or otherwise provide (and SnMF 620 may receive or otherwise obtain) a sensing report. For example, base station 610 may transmit the sensing report to SnMF 620 directly or via AMF 615. The format for the sensing report may be based on the sensing configuration. For example, the sensing report may carry or otherwise convey an indication of the RF signal metrics associated with the sensing waveforms and/or sensed object(s).

At 660, SnMF 620 may transmit or otherwise provide (and AMF 615 may receive or otherwise obtain) the sensing service response (e.g., the response to the sensing service request provided at 640). In some aspects, the sensing service response may carry or otherwise convey the indication of the RF signal metrics received in the sensing report. At 662, AMF 615 may transmit or otherwise provide (and UDM 625 may receive or otherwise obtain) the sensing service response. In the example illustrated in process 600, UDM 625 may forward the sensing service response to SMAS 630 at 664, e.g., after privacy verification. However, in the non-commercial deployment scenario, AMF 615 may provide the sensing service response directly to SMAS 630 (not shown). Accordingly, base station 610 may report the sensing measurements (e.g., the RF signal metrics) to SnMF 620, which forwards the sensing measurements to AMF 615, which finally forwards the sensing results to SMAS 630.

At 666, SMAS 630 may perform sensing computations. That is, SMAS 630 may use the RF signal metrics reported in the sensing report and based on the sensing measurements to identify properties associated with the object(s) being sensed. SMAS 630 may use the sensing report, along with other sensing reports, to determine a more comprehensive geographical map and/or other contextual information based on the RF sensing applications.

At 668, SMAS 630 may transmit or otherwise provide (and UE 605 may receive or otherwise obtain) the sensing results. The sensing results may include an indication of the properties associated with the sensed object(s) corresponding to the sensing report and/or may correspond to more comprehensive geographical and/or contextual information.

Figure 7:
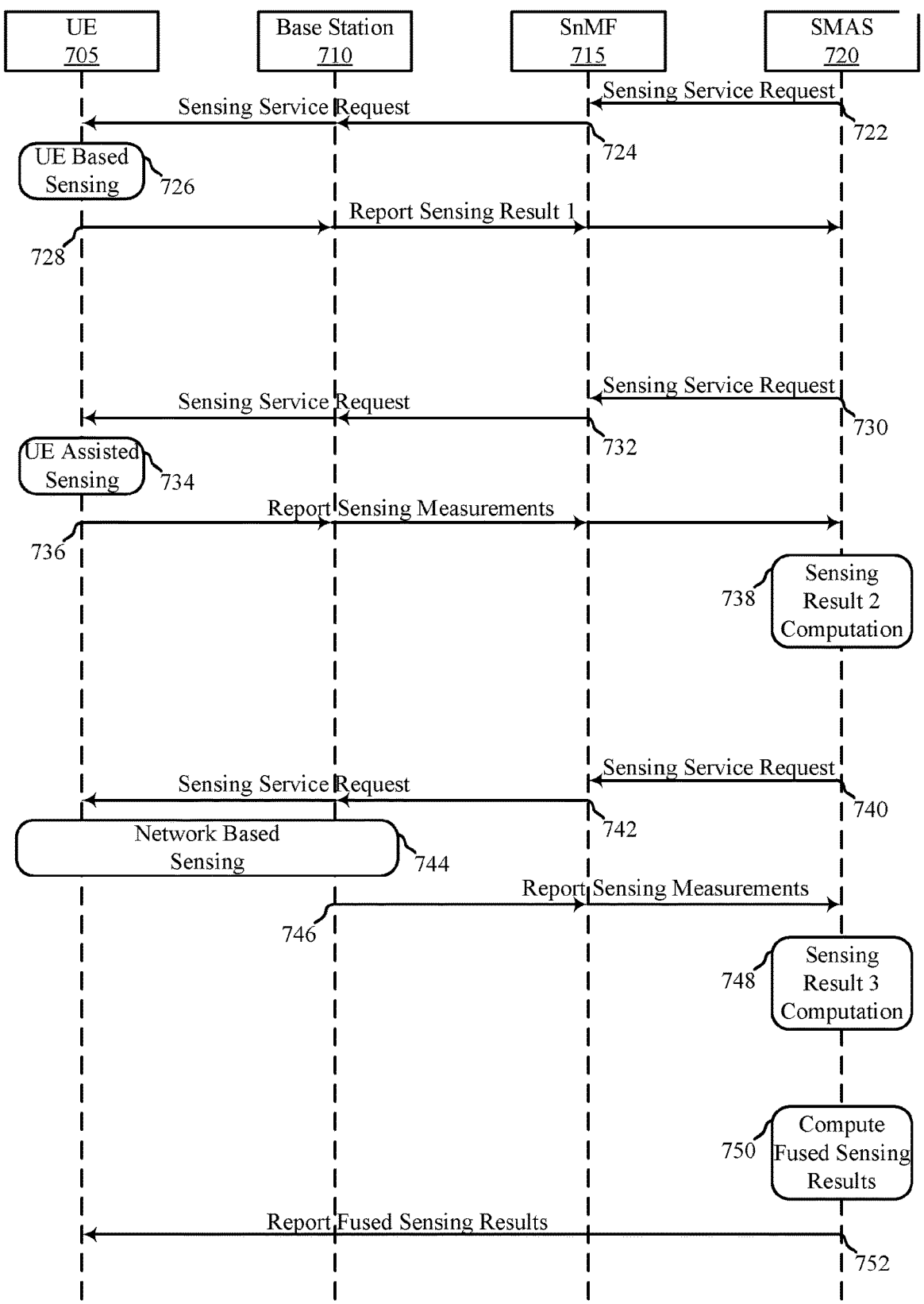
FIG. 7 illustrates an example of a process that supports sensing mode configuration for wireless sensing in accordance with aspects of the present disclosure.

FIG. 7 illustrates an example of a process 700 that supports sensing mode configuration for wireless sensing in accordance with aspects of the present disclosure. In some examples, process 700 may implement aspects of wireless communication systems 100 and/or 200, architecture 300, and/or processes 400, 500 and/or 600. Aspects of process 700 may be implemented at and/or implemented by UE 705, base station 710, SnMF 715, and/or SMAS 720, which may be examples of the corresponding devices described herein. Broadly, process 700 illustrates an example of a sensing result fusion where the UE based, UE assisted, and network based sensing configurations/modes are fused together to obtain a fused sensing result.

Initially, process 700 begins with a UE based sensing configuration mode. At 722, SMAS 720 may transmit or otherwise provide (and SnMF 715 may receive or otherwise obtain) a sensing service request. For example, when SMAS 720 is a part of a commercial system (e.g., a third party server), SMAS 720 may send the sensing service request to a UDM function within the core network for a privacy check. Otherwise, SMAS 720 may send the sensing service request directly to an AMF function within the core network when SMAS 720 is deployed as part of the RAN. At 724, SnMF 715 may transmit or otherwise provide the sensing service request to UE 705 via base station 710. Broadly, the sensing service request may initiate RF sensing applications.

Accordingly and at 726, UE 705 may perform UE based sensing where UE 705 transmits the sensing waveforms, performs the sensing measurements to identify the RF signal metrics, and uses the RF signal metrics to determine the properties associated with the object. At 728, UE 705 transmits or otherwise provides (and SMAS 720 receives or otherwise obtains) the sensing report indicating the sensing result (e.g., sensing result 1). The sensing report may indicate the RF signal metrics and/or properties associated with the objects.

Next, process 700 implements a UE assisted sensing configuration mode. At 730, SMAS 720 may transmit or otherwise provide (and SnMF 715 may receive or otherwise obtain) a sensing service request. At 732, SnMF 715 may transmit or otherwise provide the sensing service request to UE 705 via base station 710. Broadly, the sensing service request may initiate RF sensing applications.

Accordingly and at 734, UE 705 may perform UE assisted sensing where UE 705 transmits the sensing waveforms and performs the sensing measurements to identify the RF signal metrics. At 736, UE 705 transmits or otherwise provides (and SMAS 720 receives or otherwise obtains) the sensing report indicating the sensing measurements. That is, the sensing report may indicate the RF signal metrics. At 738, SMAS 720 may use the RF signal metrics to identify or otherwise determine the properties associated with the object (e.g., the sensing result, which would be sensing result 2 in this step).

Next, process 700 implements a network based sensing configuration mode. At 740, SMAS 720 may transmit or otherwise provide (and SnMF 715 may receive or otherwise obtain) a sensing service request. At 742, SnMF 715 may transmit or otherwise provide the sensing service request to UE 705 via base station 710. Broadly, the sensing service request may initiate RF sensing applications.

Accordingly and at 744, UE 705 and base station 710 may perform UE assisted sensing where UE 705 transmits the sensing waveforms and base station 710 performs the sensing measurements to identify the RF signal metrics. At 746, base station 710 transmits or otherwise provides (and SMAS 720 receives or otherwise obtains) the sensing report indicating the sensing measurements. That is, the sensing report may indicate the RF signal metrics. At 748, SMAS 720 may use the RF signal metrics to identify or otherwise determine the properties associated with the object (e.g., the sensing result, which would be sensing result 3 in this step).

At 750, SMAS 720 may compute the fused sensing results, e.g., to identify or otherwise determine a comprehensive mapping/environmental/contextual understanding of the sensed objects. That is, SMAS 720 may fuse the sensing results 1-3 obtained from multiple UEs and/or base stations. Each UE and/or base station may sense a part of the environment/context. The different sensing configurations/modes (e.g., the results of each sensing configuration/mode) may be used together and allow SMAS 720 to stitch pieces (e.g., sensing results 1-3) together to form a complete view of the environment/context.

At 752, SMAS 720 may transmit or otherwise provide (and UE 705 may receive or otherwise obtain) the fused sensing results. That is, SMAS 720 may provide an indication of the fused sensing results to UE 705 and/or base station 710. In some examples, the fused sensing results may be provided in response to a request (e.g., a request for assistance information) and/or based on SMAS 720 determining the fused sensing results.

Figure 8:
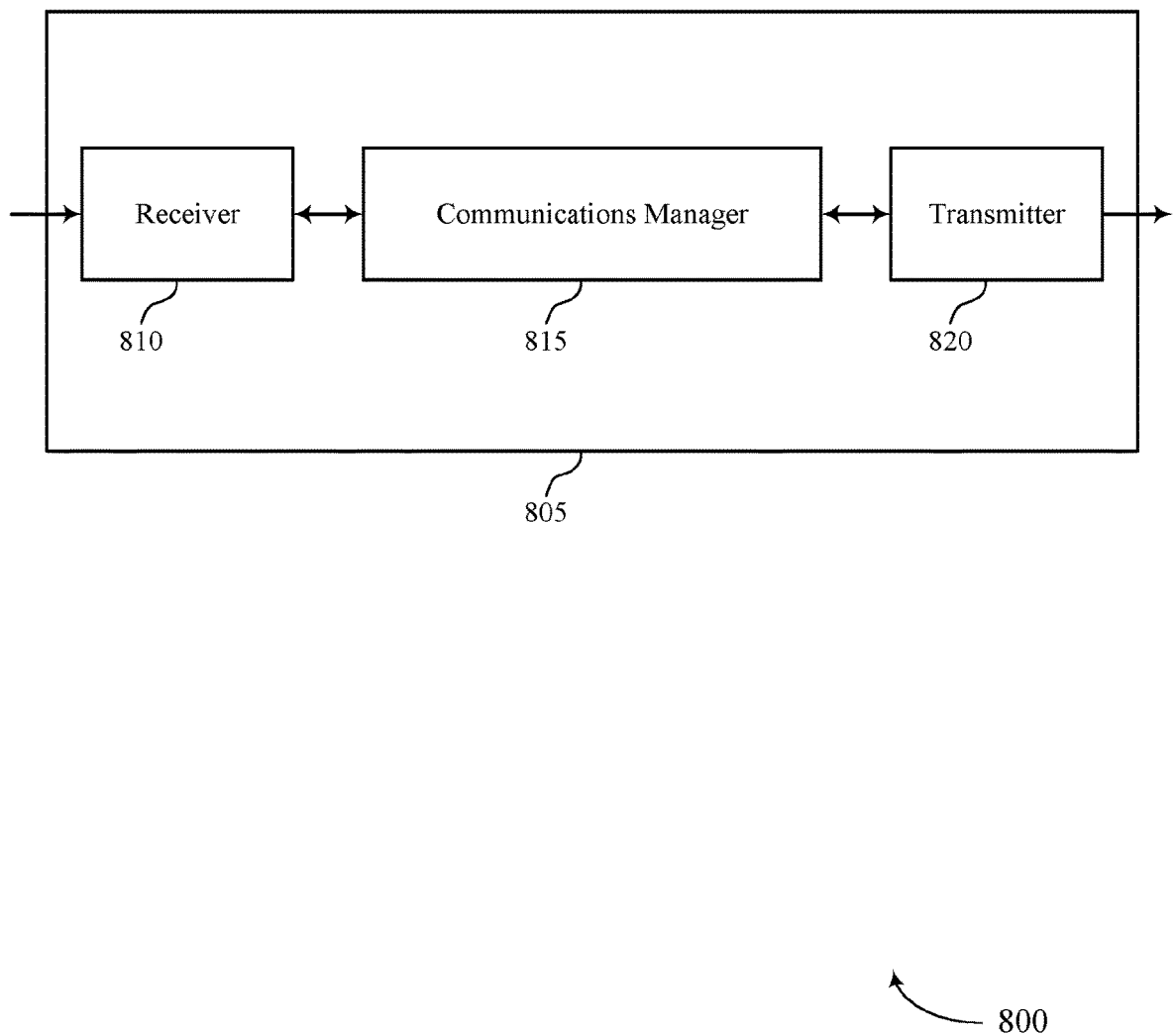
FIGS. 8 and 9 show block diagrams of devices that support sensing mode configuration for wireless sensing in accordance with aspects of the present disclosure.

FIG. 8 shows a block diagram 800 of a device 805 that supports sensing mode configuration for wireless sensing in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to sensing mode configuration for wireless sensing, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a base station, a sensing configuration associated with a sensing mode, the sensing configuration indicating one or more parameter values that the UE is to use to perform sensing of objects within a detectable range of the UE, and the sensing configurating further indicating a format for providing a sensing report according to the sensing mode, receive one or more sensing waveforms based on the sensing configuration, and transmit, to the base station according to the sensing mode, a sensing report indicating information associated with the one or more sensing waveforms. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
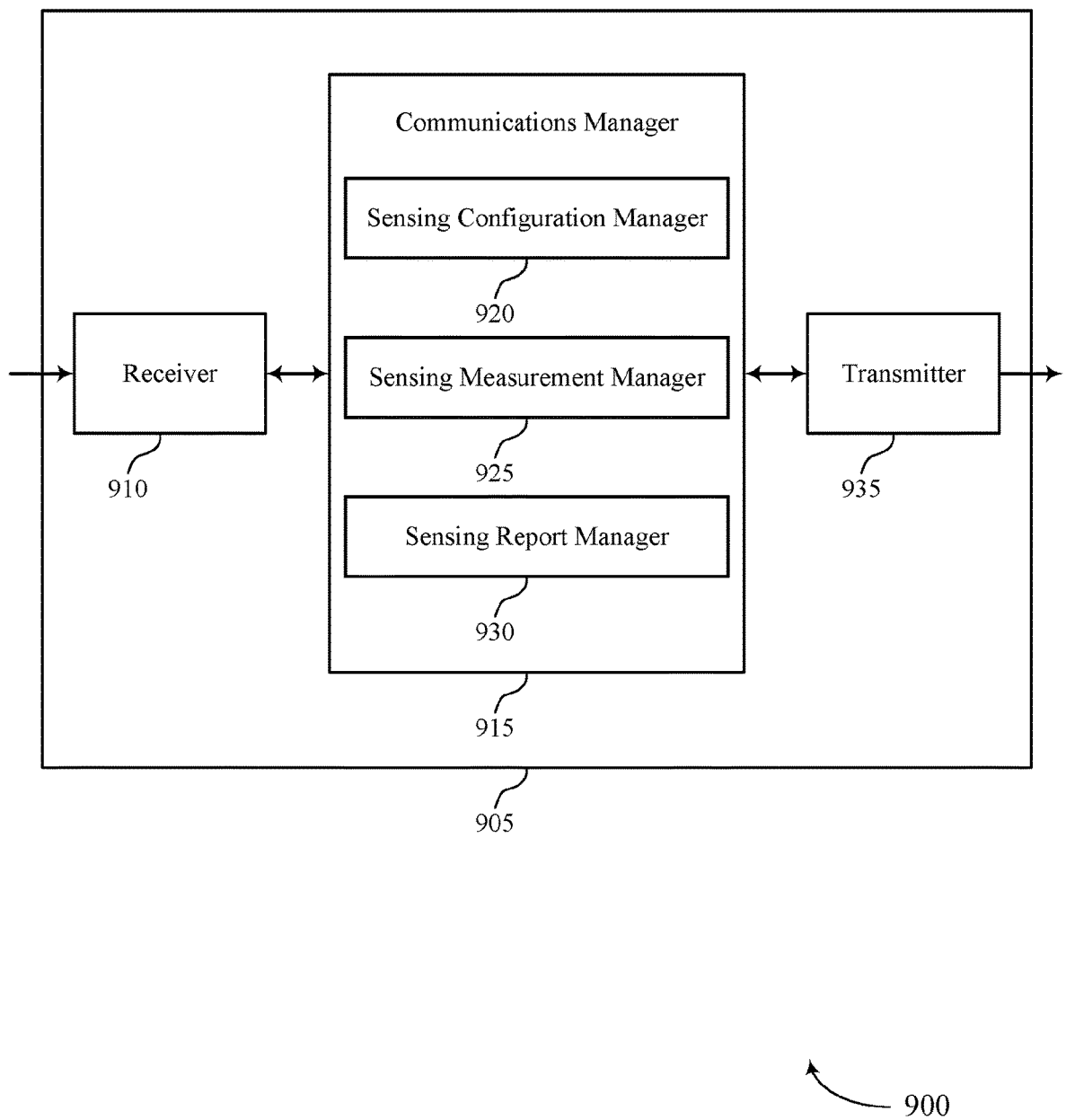

FIG. 9 shows a block diagram 900 of a device 905 that supports sensing mode configuration for wireless sensing in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to sensing mode configuration for wireless sensing, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a sensing configuration manager 920, a sensing measurement manager 925, and a sensing report manager 930. The communications manager 915 may be an example of aspects of the communications manager 1110 described herein.

The sensing configuration manager 920 may receive, from a base station, a sensing configuration associated with a sensing mode, the sensing configuration indicating one or more parameter values that the UE is to use to perform sensing of objects within a detectable range of the UE, and the sensing configurating further indicating a format for providing a sensing report according to the sensing mode.

The sensing measurement manager 925 may receive one or more sensing waveforms based on the sensing configuration.

The sensing report manager 930 may transmit, to the base station according to the sensing mode, a sensing report indicating information associated with the one or more sensing waveforms.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
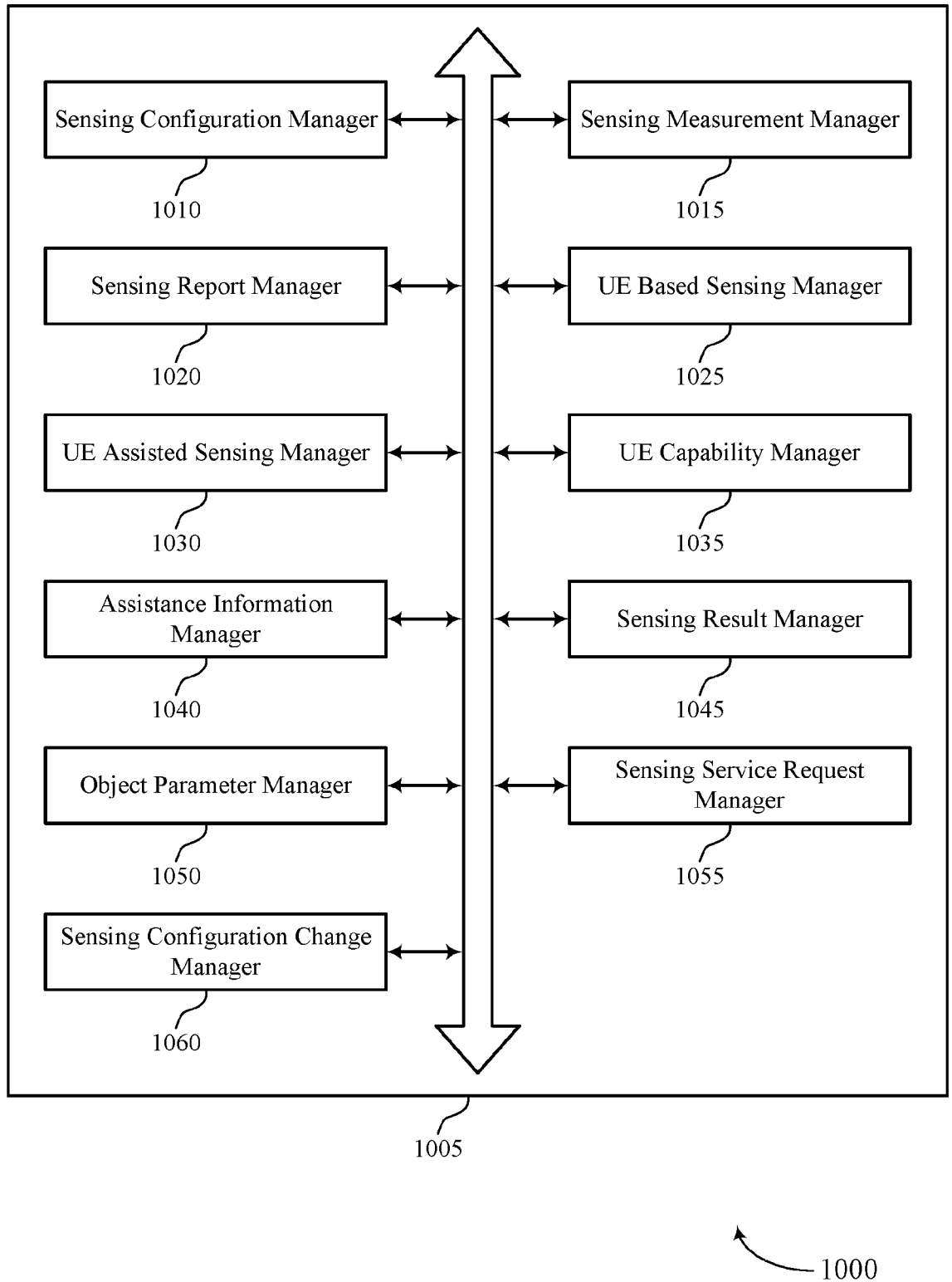
FIG. 10 shows a block diagram of a communications manager that supports sensing mode configuration for wireless sensing in accordance with aspects of the present disclosure.

FIG. 10 shows a block diagram 1000 of a communications manager 1005 that supports sensing mode configuration for wireless sensing in accordance with aspects of the present disclosure. The communications manager 1005 may be an example of aspects of a communications manager 815, a communications manager 915, or a communications manager 1110 described herein. The communications manager 1005 may include a sensing configuration manager 1010, a sensing measurement manager 1015, a sensing report manager 1020, an UE based sensing manager 1025, an UE assisted sensing manager 1030, an UE capability manager 1035, an assistance information manager 1040, a sensing result manager 1045, an object parameter manager 1050, a sensing service request manager 1055, and a sensing configuration change manager 1060. Each of these modules may communicate, directly or indirectly, with one another (e.g., via one or more buses).

The sensing configuration manager 1010 may receive, from a base station, a sensing configuration associated with a sensing mode, the sensing configuration indicating one or more parameter values that the UE is to use to perform sensing of objects within a detectable range of the UE, and the sensing configurating further indicating a format for providing a sensing report according to the sensing mode. In some examples, the sensing configuration manager 1010 may receive the sensing configuration from the base station is based on a sensing service request from one or more sensing management network nodes within a core network associated with the base station.

The sensing measurement manager 1015 may receive one or more sensing waveforms based on the sensing configuration.

The sensing report manager 1020 may transmit, to the base station according to the sensing mode, a sensing report indicating information associated with the one or more sensing waveforms.

The UE based sensing manager 1025 may determine, based on the one or more sensing waveforms, radio frequency signal metrics associated with an object. In some examples, determining, based on the radio frequency signal metrics associated with the object, one or more properties of the object, where the information associated with the one or more sensing waveforms indicated in the sensing report includes an indication of the one or more properties associated with the object.

The UE assisted sensing manager 1030 may determine, based on the one or more sensing waveforms, radio frequency signal metrics associated with an object, where the information associated with the one or more sensing waveforms indicated in the sensing report includes an indication of the radio frequency signal metrics. In some examples, the UE assisted sensing manager 1030 may receive, from the base station and based on the radio frequency signal metrics, an indication of one or more properties of the object.

The UE capability manager 1035 may receive, from the base station, a request for a capability of the UE to perform the sensing of objects within the detectable range of the UE. In some examples, the UE capability manager 1035 may transmit, to the base station and based on the request, a UE capability message indicating the capability of the UE to perform sensing of objects within the detectable range of the UE, where the sensing configuration is received based on the UE capability message.

The assistance information manager 1040 may transmit, to the base station, a request for assistance information. In some examples, the assistance information manager 1040 may receive, from the base station and based on the request, assistance information, the sensing report based on the assistance information.

The sensing result manager 1045 may receive, from the base station, a sensing result request message, where the sensing report is transmitted based on the sensing result request message.

The object parameter manager 1050 may transmit, to the base station, a request for object parameter information associated with one or more objects, the object parameter information based on a corresponding one or more sensing reports the base station has received from the UE, other UE, or both. In some examples, the object parameter manager 1050 may receive, from the base station and based on the request, the object parameter information.

The sensing service request manager 1055 may receive, from the base station, a sensing service request for the UE to perform sensing of objects within the detectable range of the UE, where the sensing configuration is received based on the sensing service request.

The sensing configuration change manager 1060 may receive, from the base station, a second sensing configuration associated with a second sensing mode. In some examples, the sensing configuration change manager 1060 may switch to sensing operations according to the second sensing mode based on receiving the second sensing configuration. In some cases, the first sensing mode includes one of a UE-based sensing mode, a UE-assisted sensing mode, or a network-based sensing mode. In some cases, the second sensing mode includes a different one of the UE-based sensing mode, the UE-assisted sensing mode, or the network-based sensing mode.

Figure 11:
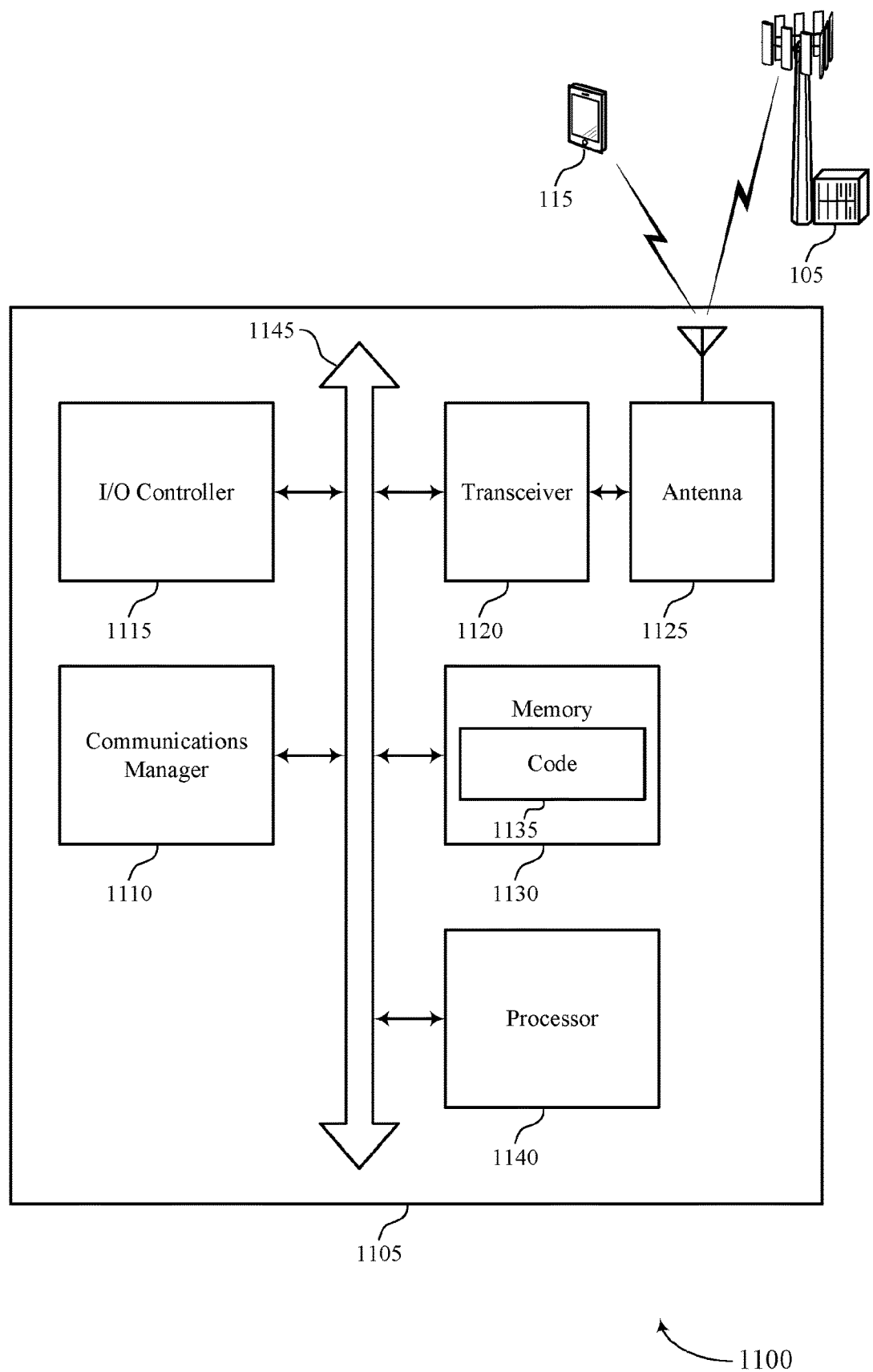
FIG. 11 shows a diagram of a system including a device that supports sensing mode configuration for wireless sensing in accordance with aspects of the present disclosure.

FIG. 11 shows a diagram of a system 1100 including a device 1105 that supports sensing mode configuration for wireless sensing in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, from a base station, a sensing configuration associated with a sensing mode, the sensing configuration indicating one or more parameter values that the UE is to use to perform sensing of objects within a detectable range of the UE, and the sensing configurating further indicating a format for providing a sensing report according to the sensing mode, receive one or more sensing waveforms based on the sensing configuration, and transmit, to the base station according to the sensing mode, a sensing report indicating information associated with the one or more sensing waveforms.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting sensing mode configuration for wireless sensing).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
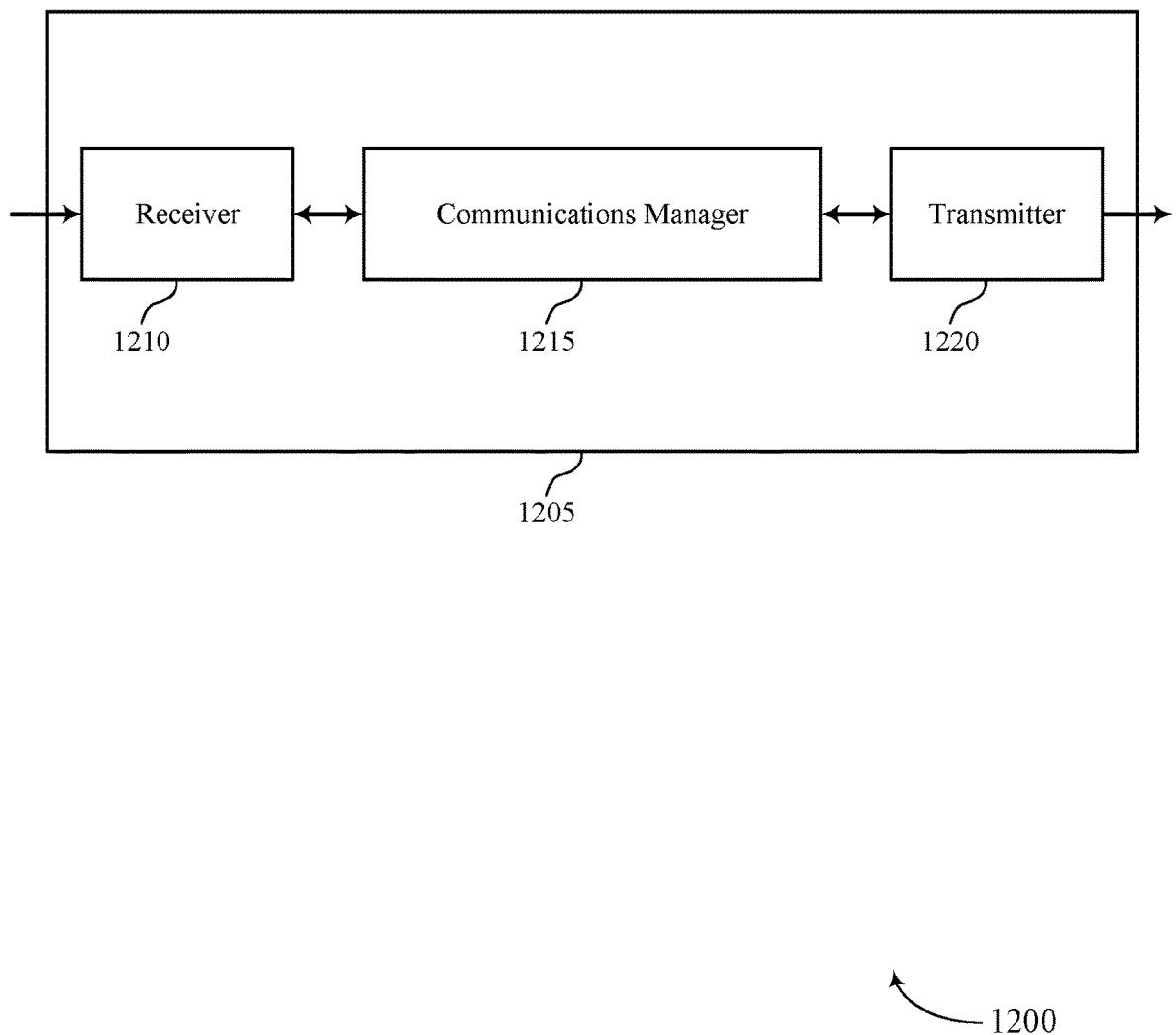
FIGS. 12 and 13 show block diagrams of devices that support sensing mode configuration for wireless sensing in accordance with aspects of the present disclosure.

FIG. 12 shows a block diagram 1200 of a device 1205 that supports sensing mode configuration for wireless sensing in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to sensing mode configuration for wireless sensing, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit, to a UE, a sensing configuration associated with a sensing mode, the sensing configuration indicating one or more parameter values that the UE is to use to perform sensing of objects within a detectable range of the UE, receive one or more sensing waveforms transmitted by the UE based on the sensing configuration, and transmit, to a network node and according to the sensing mode, a sensing report indicating information associated with the one or more sensing waveforms. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
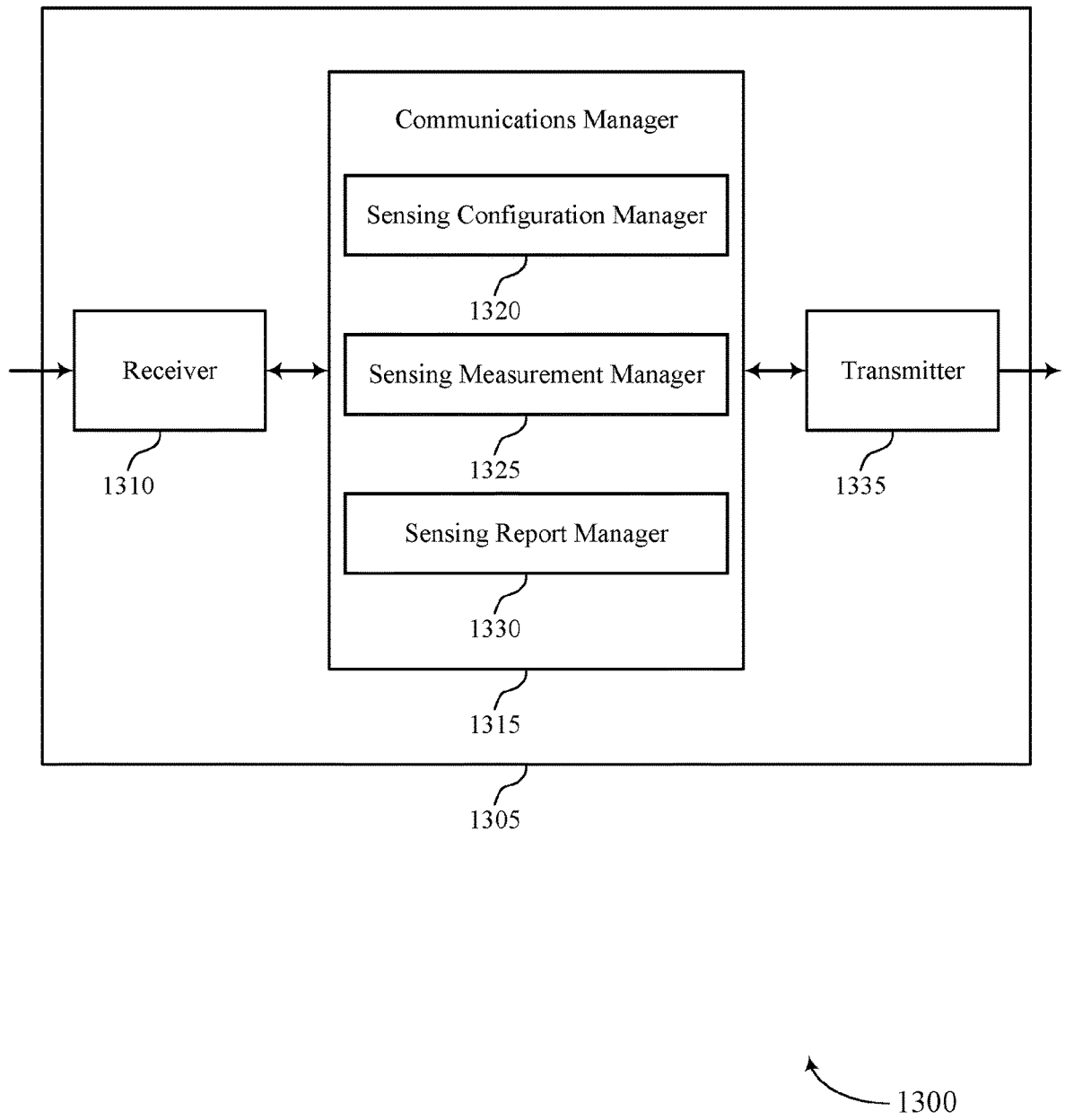

FIG. 13 shows a block diagram 1300 of a device 1305 that supports sensing mode configuration for wireless sensing in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to sensing mode configuration for wireless sensing, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a sensing configuration manager 1320, a sensing measurement manager 1325, and a sensing report manager 1330. The communications manager 1315 may be an example of aspects of the communications manager 1510 described herein.

The sensing configuration manager 1320 may transmit, to a UE, a sensing configuration associated with a sensing mode, the sensing configuration indicating one or more parameter values that the UE is to use to perform sensing of objects within a detectable range of the UE.

The sensing measurement manager 1325 may receive one or more sensing waveforms transmitted by the UE based on the sensing configuration.

The sensing report manager 1330 may transmit, to a network node and according to the sensing mode, a sensing report indicating information associated with the one or more sensing waveforms.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
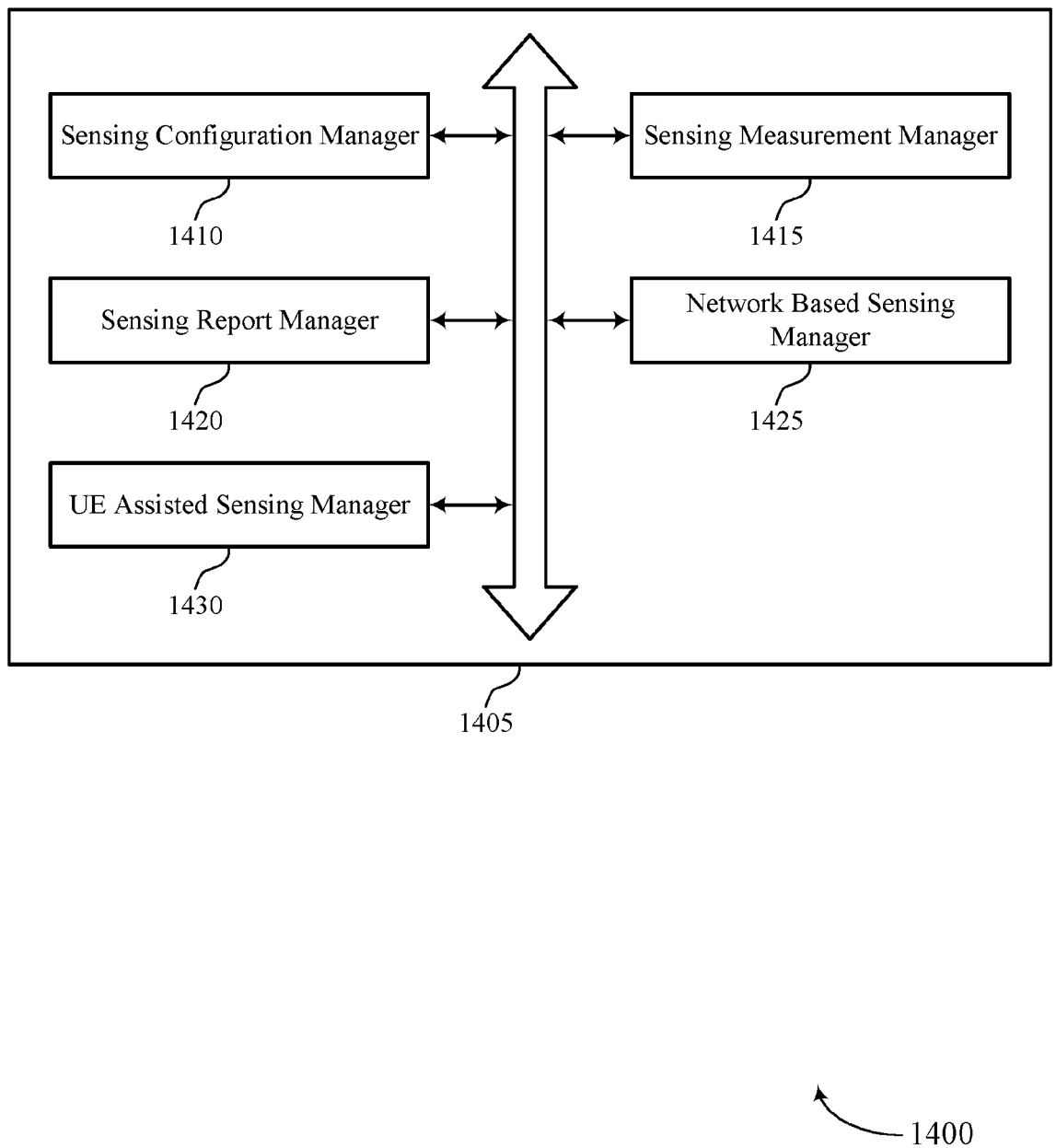
FIG. 14 shows a block diagram of a communications manager that supports sensing mode configuration for wireless sensing in accordance with aspects of the present disclosure.

FIG. 14 shows a block diagram 1400 of a communications manager 1405 that supports sensing mode configuration for wireless sensing in accordance with aspects of the present disclosure. The communications manager 1405 may be an example of aspects of a communications manager 1215, a communications manager 1315, or a communications manager 1510 described herein. The communications manager 1405 may include a sensing configuration manager 1410, a sensing measurement manager 1415, a sensing report manager 1420, a network based sensing manager 1425, and an UE assisted sensing manager 1430. Each of these modules may communicate, directly or indirectly, with one another (e.g., via one or more buses).

The sensing configuration manager 1410 may transmit, to a UE, a sensing configuration associated with a sensing mode, the sensing configuration indicating one or more parameter values that the UE is to use to perform sensing of objects within a detectable range of the UE.

The sensing measurement manager 1415 may receive one or more sensing waveforms transmitted by the UE based on the sensing configuration.

The sensing report manager 1420 may transmit, to a network node and according to the sensing mode, a sensing report indicating information associated with the one or more sensing waveforms.

The network based sensing manager 1425 may determine, based on the one or more sensing waveforms, radio frequency metrics associated with an object.

In some examples, determining, based on the radio frequency signal metrics associated with the object, one or more properties of the object, where the information associated with the one or more sensing waveforms indicated in the sensing report includes an indication of one or more properties of the object.

The UE assisted sensing manager 1430 may determine, based on the one or more sensing waveforms, radio frequency signal metrics associated with an object, where the information associated with the one or more sensing waveforms indicated in the sensing report includes an indication of radio frequency signal metrics.

Figure 15:
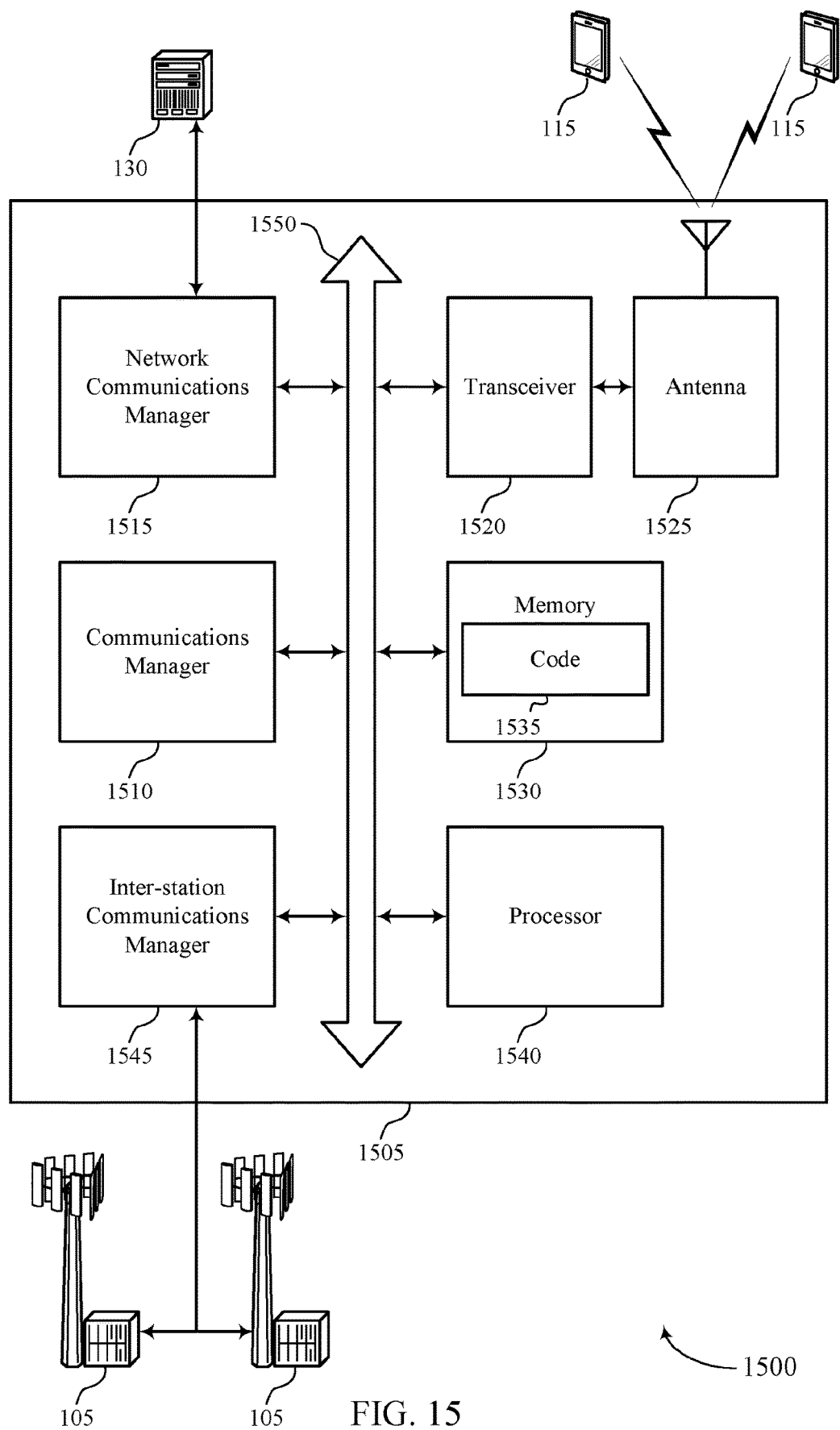
FIG. 15 shows a diagram of a system including a device that supports sensing mode configuration for wireless sensing in accordance with aspects of the present disclosure.

FIG. 15 shows a diagram of a system 1500 including a device 1505 that supports sensing mode configuration for wireless sensing in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit, to a UE, a sensing configuration associated with a sensing mode, the sensing configuration indicating one or more parameter values that the UE is to use to perform sensing of objects within a detectable range of the UE, receive one or more sensing waveforms transmitted by the UE based on the sensing configuration, and transmit, to a network node and according to the sensing mode, a sensing report indicating information associated with the one or more sensing waveforms.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting sensing mode configuration for wireless sensing).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
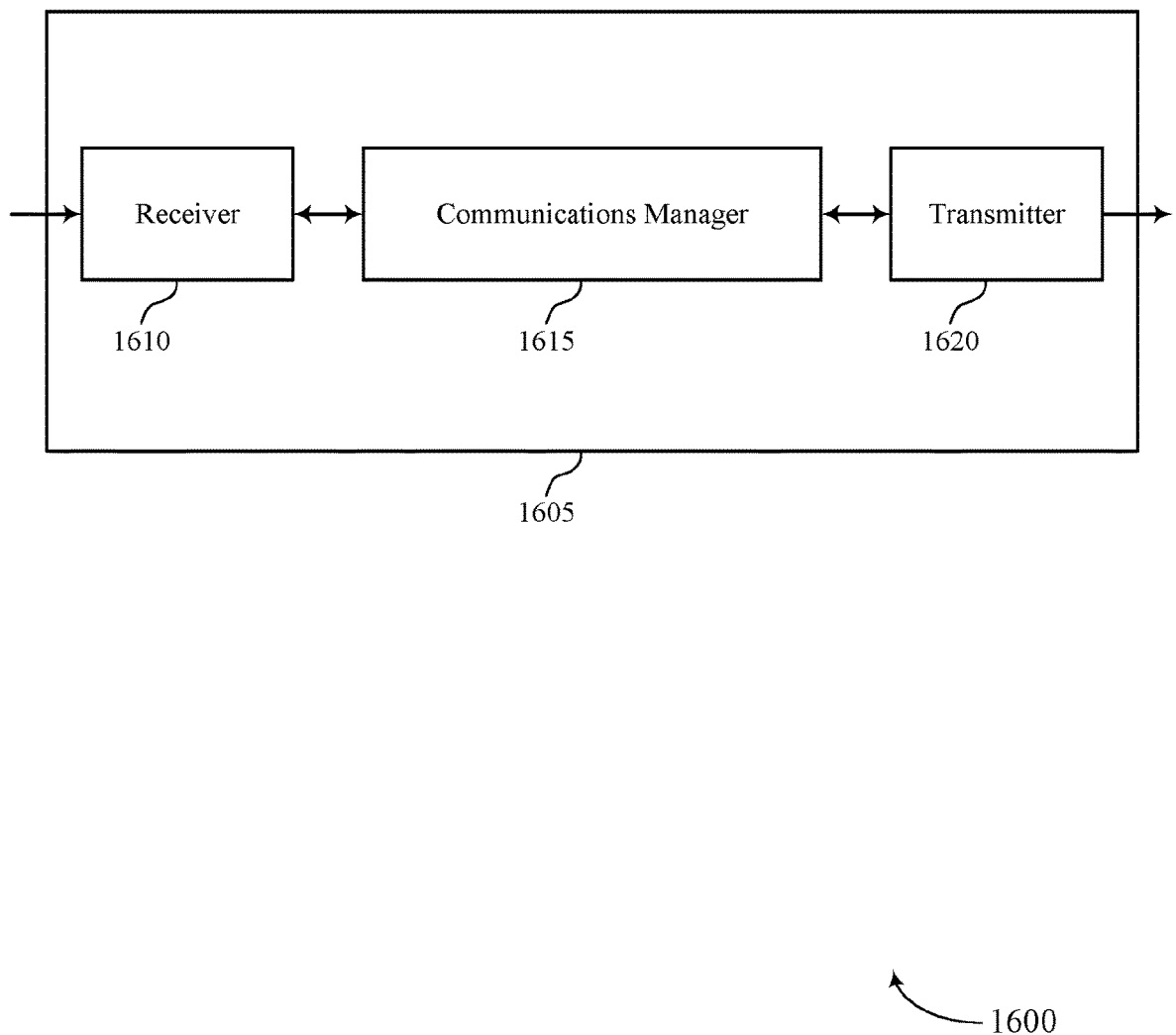
FIGS. 16 and 17 show block diagrams of devices that support sensing mode configuration for wireless sensing in accordance with aspects of the present disclosure.

FIG. 16 shows a block diagram 1600 of a device 1605 that supports sensing mode configuration for wireless sensing in accordance with aspects of the present disclosure. The device 1605 may be an example of aspects of a network entity (e.g., an SnMF and/or SMAS) as described herein. The device 1605 may include a receiver 1610, a communications manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to sensing mode configuration for wireless sensing, etc.). Information may be passed on to other components of the device 1605. The receiver 1610 may be an example of aspects of the transceiver 1920 described with reference to FIG. 19. The receiver 1610 may utilize a single antenna or a set of antennas.

The communications manager 1615 may provide a sensing configuration for a UE, the sensing configuration associated with a sensing mode and indicating one or more parameter values that the UE is to use to perform sensing of objects within a detectable range of the UE, and the sensing configurating further indicating a format for providing a sensing report according to the sensing mode and obtain, based on the transmitted sensing configuration, an indication of a sensing report from the UE that indicates information associated with the UE receiving one or more sensing waveforms reflected off of one or more sensed objects. The communications manager 1615 may be an example of aspects of the communications manager 1910 described herein.

The communications manager 1615, or its sub-components, may be implemented in hardware, code (e.g., software or firmware) executed by a processor, or any combination thereof. If implemented in code executed by a processor, the functions of the communications manager 1615, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1615, or its sub-components, may be physically located at various positions, including being distributed such that portions of functions are implemented at different physical locations by one or more physical components. In some examples, the communications manager 1615, or its sub-components, may be a separate and distinct component in accordance with various aspects of the present disclosure. In some examples, the communications manager 1615, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

Figure 17:
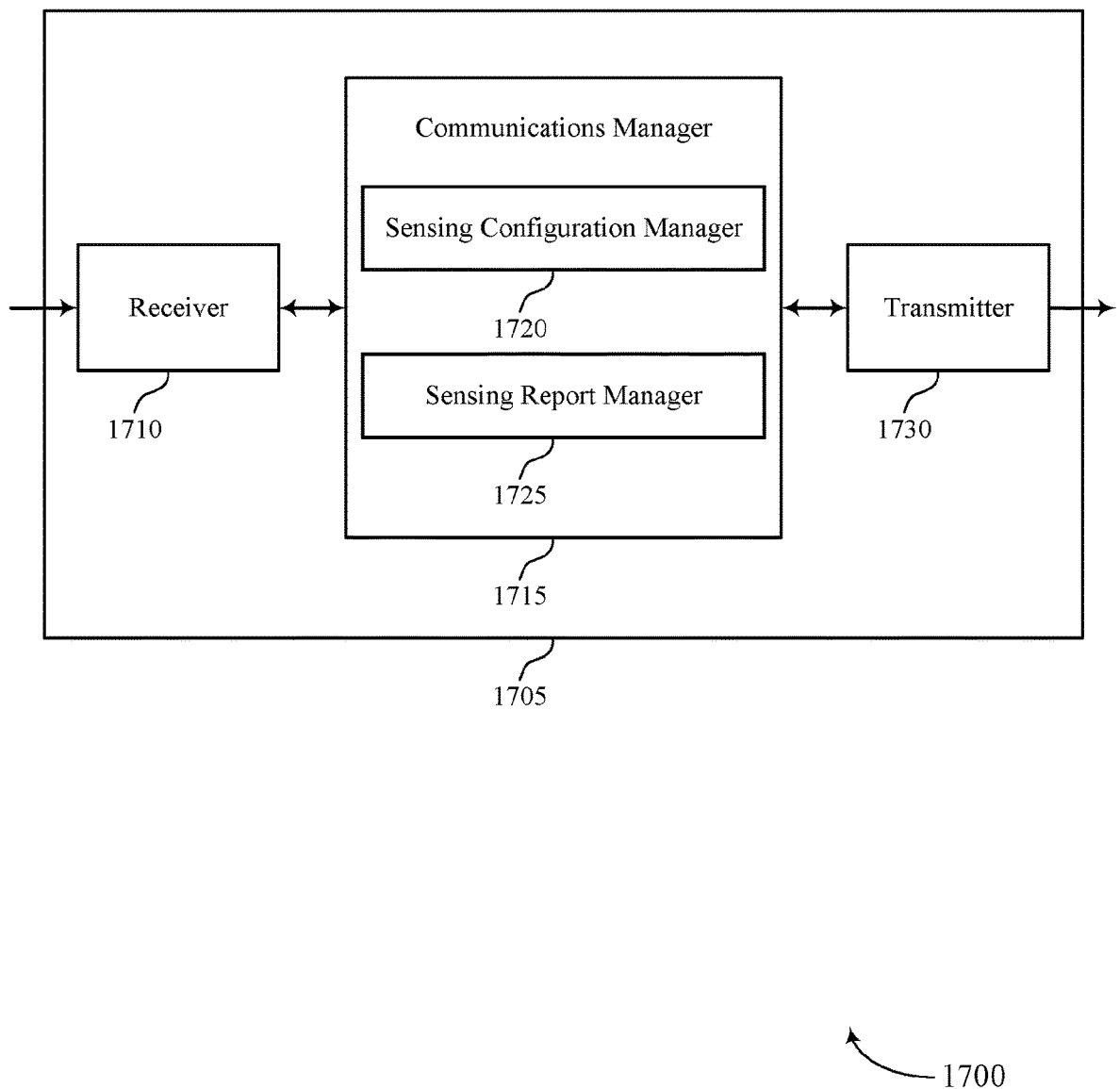

FIG. 17 shows a block diagram 1700 of a device 1705 that supports sensing mode configuration for wireless sensing in accordance with aspects of the present disclosure. The device 1705 may be an example of aspects of a device 1605 or a network entity 115 as described herein. The device 1705 may include a receiver 1710, a communications manager 1715, and a transmitter 1730. The device 1705 may also include a processor. Each of these components may be in communication with one another (e.g., via one or more buses).

The receiver 1710 may receive information such as packets, user data, or control information associated with various information channels (e.g., control channels, data channels, and information related to sensing mode configuration for wireless sensing, etc.). Information may be passed on to other components of the device 1705. The receiver 1710 may be an example of aspects of the transceiver 1920 described with reference to FIG. 19. The receiver 1710 may utilize a single antenna or a set of antennas.

The communications manager 1715 may be an example of aspects of the communications manager 1615 as described herein. The communications manager 1715 may include a sensing configuration manager 1720 and a sensing report manager 1725. The communications manager 1715 may be an example of aspects of the communications manager 1910 described herein.

The sensing configuration manager 1720 may provide a sensing configuration for a UE, the sensing configuration associated with a sensing mode and indicating one or more parameter values that the UE is to use to perform sensing of objects within a detectable range of the UE, and the sensing configurating further indicating a format for providing a sensing report according to the sensing mode.

The sensing report manager 1725 may obtain, based on the transmitted sensing configuration, an indication of a sensing report from the UE that indicates information associated with the UE receiving one or more sensing waveforms reflected off of one or more sensed objects.

The transmitter 1720 may transmit signals generated by other components of the device 1705. In some examples, the transmitter 1720 may be collocated with a receiver 1710 in a transceiver module. For example, the transmitter 1720 may be an example of aspects of the transceiver 1920 described with reference to FIG. 19. The transmitter 1720 may utilize a single antenna or a set of antennas.

Figure 18:
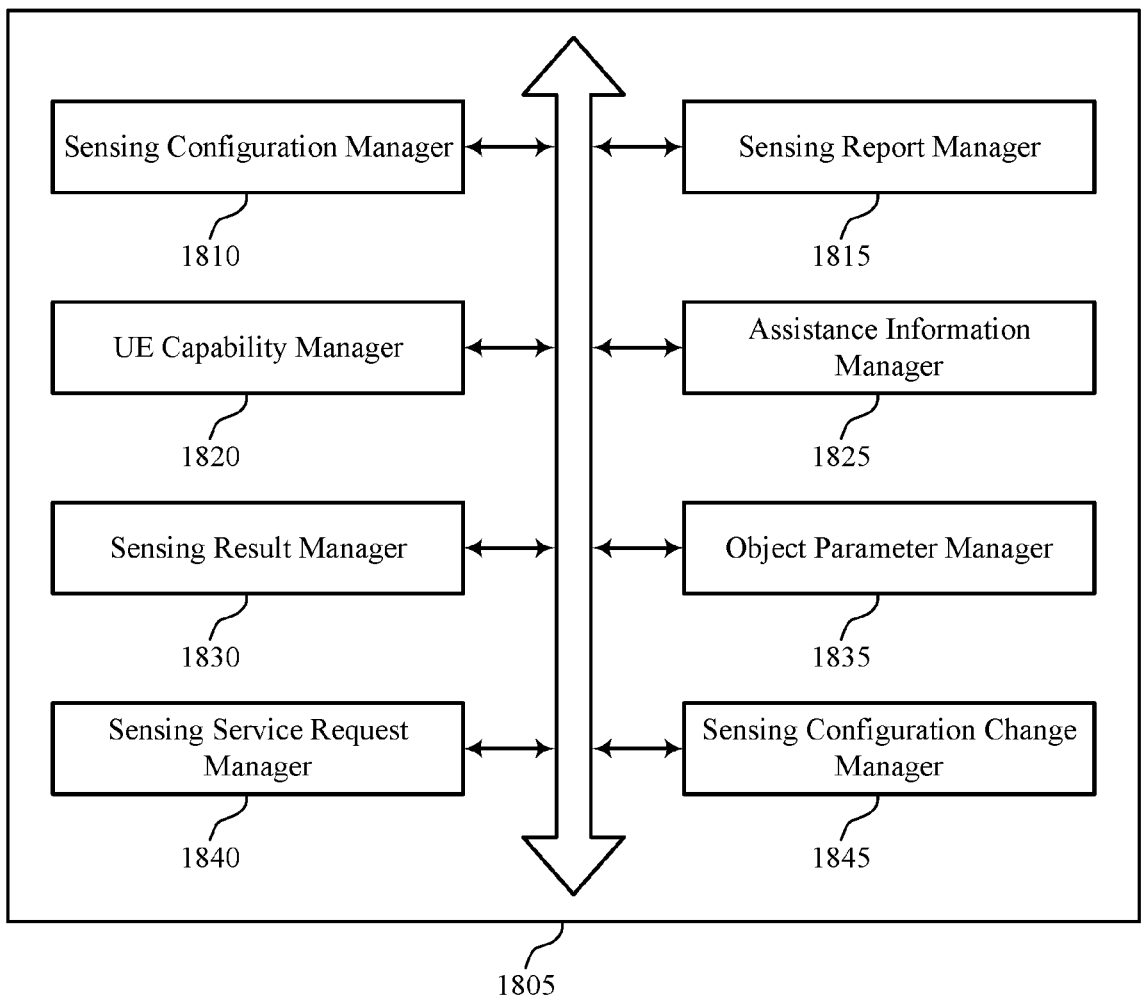
FIG. 18 shows a block diagram of a communications manager that supports sensing mode configuration for wireless sensing in accordance with aspects of the present disclosure.

FIG. 18 shows a block diagram 1800 of a communications manager 1805 that supports sensing mode configuration for wireless sensing in accordance with aspects of the present disclosure. The communications manager 1805 may be an example of aspects of a communications manager 1615, a communications manager 1715, or a communications manager 1910 described herein. The communications manager 1805 may include a sensing configuration manager 1810, a sensing report manager 1815, an UE capability manager 1820, an assistance information manager 1825, a sensing result manager 1830, an object parameter manager 1835, a sensing service request manager 1840, and a sensing configuration change manager 1845. Each of these modules may communicate, directly or indirectly, with one another (e.g., via one or more buses).

The sensing configuration manager 1810 may provide a sensing configuration for a UE, the sensing configuration associated with a sensing mode and indicating one or more parameter values that the UE is to use to perform sensing of objects within a detectable range of the UE, and the sensing configurating further indicating a format for providing a sensing report according to the sensing mode.

The sensing report manager 1815 may obtain, based on the transmitted sensing configuration, an indication of a sensing report from the UE that indicates information associated with the UE receiving one or more sensing waveforms reflected off of one or more sensed objects. In some examples, the sensing report manager 1815 may determine, based on the radio frequency signal metrics, one or more properties of an object. In some examples, the sensing report manager 1815 may provide, for the UE, an indication of one or more properties of the object. In some cases, the information associated with the one or more sensing waveforms indicated in the sensing report includes an indication of one or more properties of an object. In some cases, the information associated with the one or more sensing waveforms indicated in the sensing report includes an indication of radio frequency signal metrics associated with the one or more sensing waveforms.

The UE capability manager 1820 may provide, for the UE, a request for a capability of the UE to perform the sensing of objects within the detectable range of the UE. In some examples, the UE capability manager 1820 may obtain, from the UE and based on the request, a UE capability message indicating the capability of the UE to perform sensing of objects within the detectable range of the UE, where the sensing configuration is provided for the UE based on the UE capability message.

The assistance information manager 1825 may obtain, from the UE, a request for assistance information message. In some examples, the assistance information manager 1825 may provide, for the UE, assistance information in response to the request, the sensing report based on the assistance information.

The sensing result manager 1830 may provide, for the UE, a sensing result request message, where the sensing report is obtained based on the sensing result request message.

The object parameter manager 1835 may obtain, from the UE, a request for object parameter information associated with one or more objects, the object parameter information based on one or more sensing reports the network node has received from the UE, other UE, or both. In some examples, the object parameter manager 1835 may determine the object parameter information based on the one or more sensing reports. In some examples, the object parameter manager 1835 may provide, for the UE and based on the request, the object parameter information.

The sensing service request manager 1840 may provide, for the UE, a sensing service request for the UE to perform sensing of objects within the detectable range of the UE, where the sensing configuration is provided for the UE based on the sensing service request.

The sensing configuration change manager 1845 may provide, for the UE, a second sensing configuration associated with a second sensing mode, where the UE switches to sensing operations according to the second sensing mode based on the second sensing configuration. In some cases, the first sensing mode includes one of a UE-based sensing mode, a UE-assisted sensing mode, or a network-based sensing mode.

In some cases, the second sensing mode includes a different one of the UE-based sensing mode, the UE-assisted sensing mode, or the network-based sensing mode.

Figure 19:
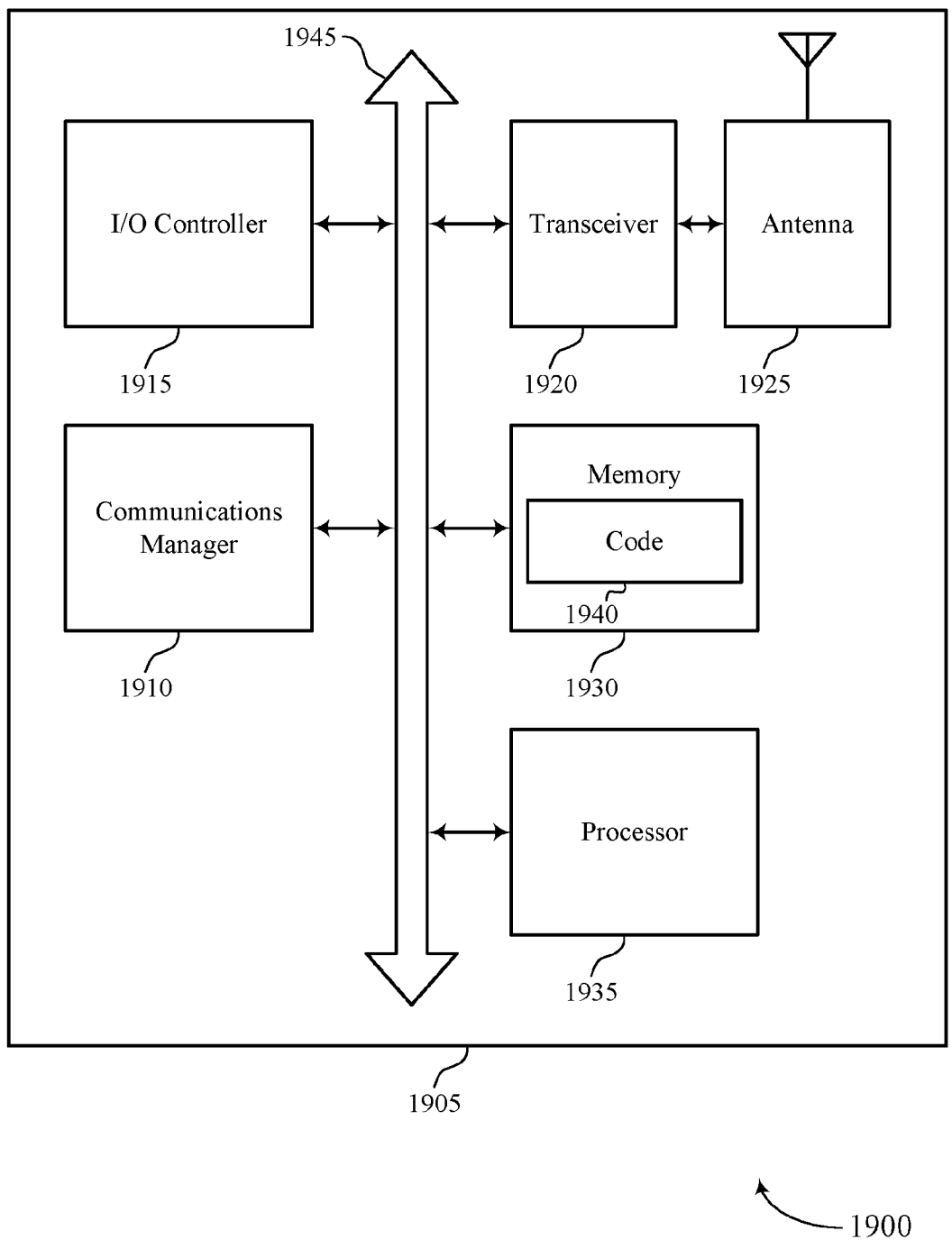
FIG. 19 shows a diagram of a system including a device that supports sensing mode configuration for wireless sensing in accordance with aspects of the present disclosure.

FIG. 19 shows a diagram of a system 1900 including a device 1905 that supports sensing mode configuration for wireless sensing in accordance with aspects of the present disclosure. The device 1905 may be an example of or include the components of device 1605, device 1705, or a network entity as described herein. The device 1905 may include components for bi-directional voice and data communications including components for transmitting and receiving communications, including a communications manager 1910, an I/O controller 1915, a transceiver 1920, an antenna 1925, memory 1930, and a processor 1935. These components may be in electronic communication via one or more buses (e.g., bus 1945).

The communications manager 1910 may provide a sensing configuration for a UE, the sensing configuration associated with a sensing mode and indicating one or more parameter values that the UE is to use to perform sensing of objects within a detectable range of the UE, and the sensing configurating further indicating a format for providing a sensing report according to the sensing mode and obtain, based on the transmitted sensing configuration, an indication of a sensing report from the UE that indicates information associated with the UE receiving one or more sensing waveforms reflected off of one or more sensed objects.

The I/O controller 1915 may manage input and output signals for the device 1905. The I/O controller 1915 may also manage peripherals not integrated into the device 1905. In some cases, the I/O controller 1915 may represent a physical connection or port to an external peripheral. In some cases, the I/O controller 1915 may utilize an operating system such as iOS®, ANDROID®, MS-DOS®, MS-WINDOWS®, OS/2®, UNIX®, LINUX®, or another known operating system. In other cases, the I/O controller 1915 may represent or interact with a modem, a keyboard, a mouse, a touchscreen, or a similar device. In some cases, the I/O controller 1915 may be implemented as part of a processor. In some cases, a user may interact with the device 1905 via the I/O controller 1915 or via hardware components controlled by the I/O controller 1915.

The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM and ROM. The memory 1930 may store computer-readable, computer-executable code 1940 including instructions that, when executed, cause the processor to perform various functions described herein. In some cases, the memory 1930 may contain, among other things, a BIOS which may control basic hardware or software operation such as the interaction with peripheral components or devices.

The processor 1935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1935 may be configured to operate a memory array using a memory controller. In other cases, a memory controller may be integrated into the processor 1935. The processor 1935 may be configured to execute computer-readable instructions stored in a memory (e.g., the memory 1930) to cause the device 1905 to perform various functions (e.g., functions or tasks supporting sensing mode configuration for wireless sensing).

The code 1940 may include instructions to implement aspects of the present disclosure, including instructions to support wireless communications. The code 1940 may be stored in a non-transitory computer-readable medium such as system memory or other type of memory. In some cases, the code 1940 may not be directly executable by the processor 1935 but may cause a computer (e.g., when compiled and executed) to perform functions described herein.

Figure 20:
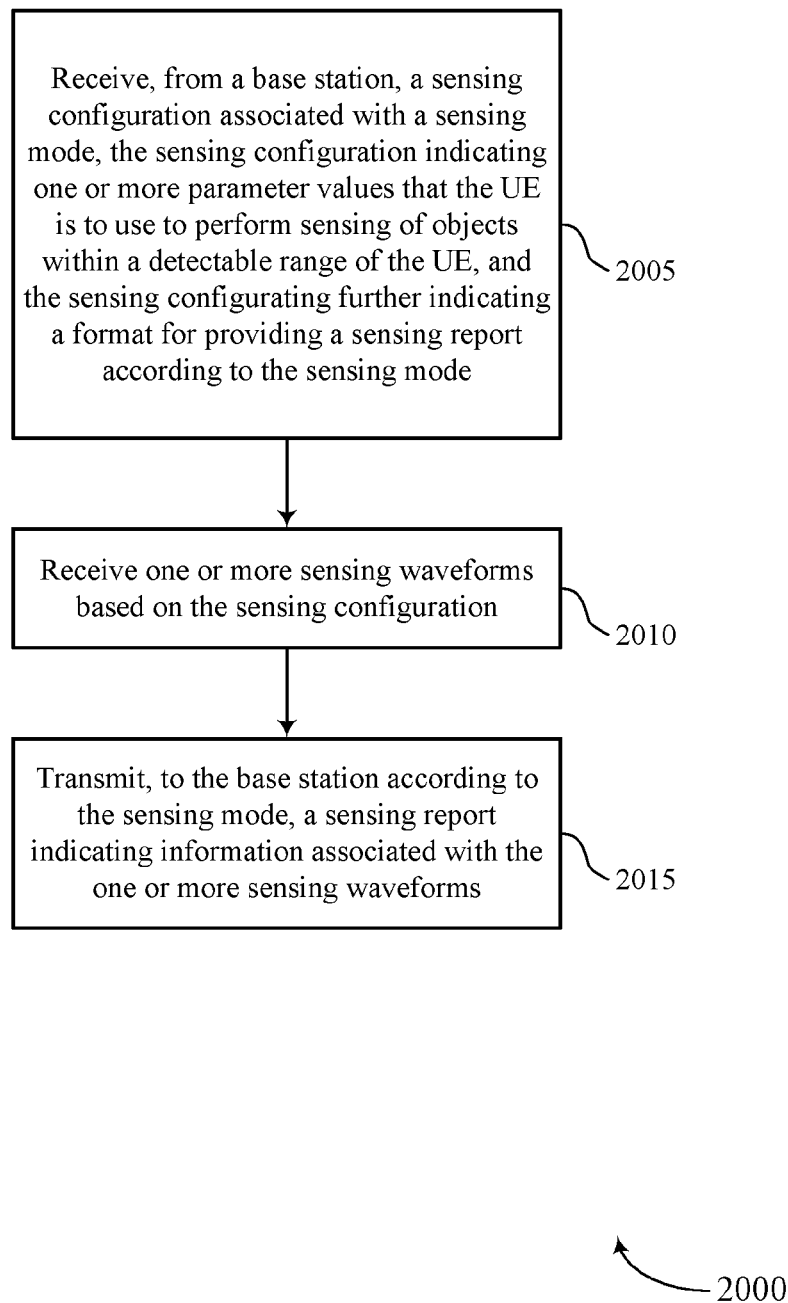
FIGS. 20 through 24 show flowcharts illustrating methods that support sensing mode configuration for wireless sensing in accordance with aspects of the present disclosure.

FIG. 20 shows a flowchart illustrating a method 2000 that supports sensing mode configuration for wireless sensing in accordance with aspects of the present disclosure. The operations of method 2000 may be implemented by a UE 115 or its components as described herein. For example, the operations of method 2000 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2005, the UE may receive, from a base station, a sensing configuration associated with a sensing mode, the sensing configuration indicating one or more parameter values that the UE is to use to perform sensing of objects within a detectable range of the UE, and the sensing configurating further indicating a format for providing a sensing report according to the sensing mode. The operations of 2005 may be performed according to the methods described herein. In some examples, aspects of the operations of 2005 may be performed by a sensing configuration manager as described with reference to FIGS. 8 through 11.

At 2010, the UE may receive one or more sensing waveforms based on the sensing configuration. The operations of 2010 may be performed according to the methods described herein. In some examples, aspects of the operations of 2010 may be performed by a sensing measurement manager as described with reference to FIGS. 8 through 11.

At 2015, the UE may transmit, to the base station according to the sensing mode, a sensing report indicating information associated with the one or more sensing waveforms. The operations of 2015 may be performed according to the methods described herein. In some examples, aspects of the operations of 2015 may be performed by a sensing report manager as described with reference to FIGS. 8 through 11.

Figure 21:
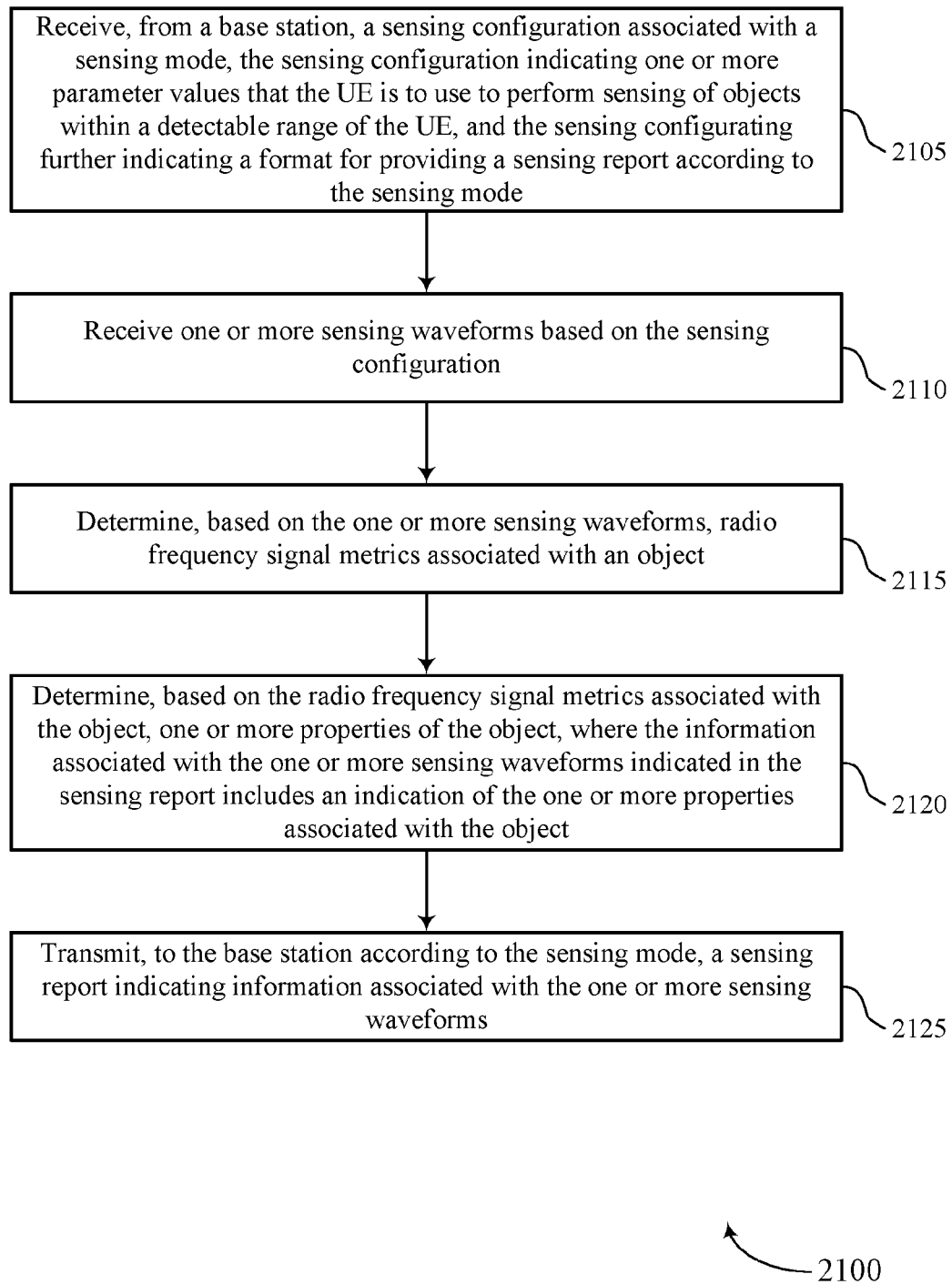

FIG. 21 shows a flowchart illustrating a method 2100 that supports sensing mode configuration for wireless sensing in accordance with aspects of the present disclosure. The operations of method 2100 may be implemented by a UE 115 or its components as described herein. For example, the operations of method 2100 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2105, the UE may receive, from a base station, a sensing configuration associated with a sensing mode, the sensing configuration indicating one or more parameter values that the UE is to use to perform sensing of objects within a detectable range of the UE, and the sensing configurating further indicating a format for providing a sensing report according to the sensing mode. The operations of 2105 may be performed according to the methods described herein. In some examples, aspects of the operations of 2105 may be performed by a sensing configuration manager as described with reference to FIGS. 8 through 11.

At 2110, the UE may receive one or more sensing waveforms based on the sensing configuration. The operations of 2110 may be performed according to the methods described herein. In some examples, aspects of the operations of 2110 may be performed by a sensing measurement manager as described with reference to FIGS. 8 through 11.

At 2115, the UE may determine, based on the one or more sensing waveforms, radio frequency signal metrics associated with an object. The operations of 2115 may be performed according to the methods described herein. In some examples, aspects of the operations of 2115 may be performed by an UE based sensing manager as described with reference to FIGS. 8 through 11.

At 2120, the UE may determine, based on the radio frequency signal metrics associated with the object, one or more properties of the object, where the information associated with the one or more sensing waveforms indicated in the sensing report includes an indication of the one or more properties associated with the object. The operations of 2120 may be performed according to the methods described herein. In some examples, aspects of the operations of 2120 may be performed by an UE based sensing manager as described with reference to FIGS. 8 through 11.

At 2125, the UE may transmit, to the base station according to the sensing mode, a sensing report indicating information associated with the one or more sensing waveforms. The operations of 2125 may be performed according to the methods described herein. In some examples, aspects of the operations of 2125 may be performed by a sensing report manager as described with reference to FIGS. 8 through 11.

Figure 22:
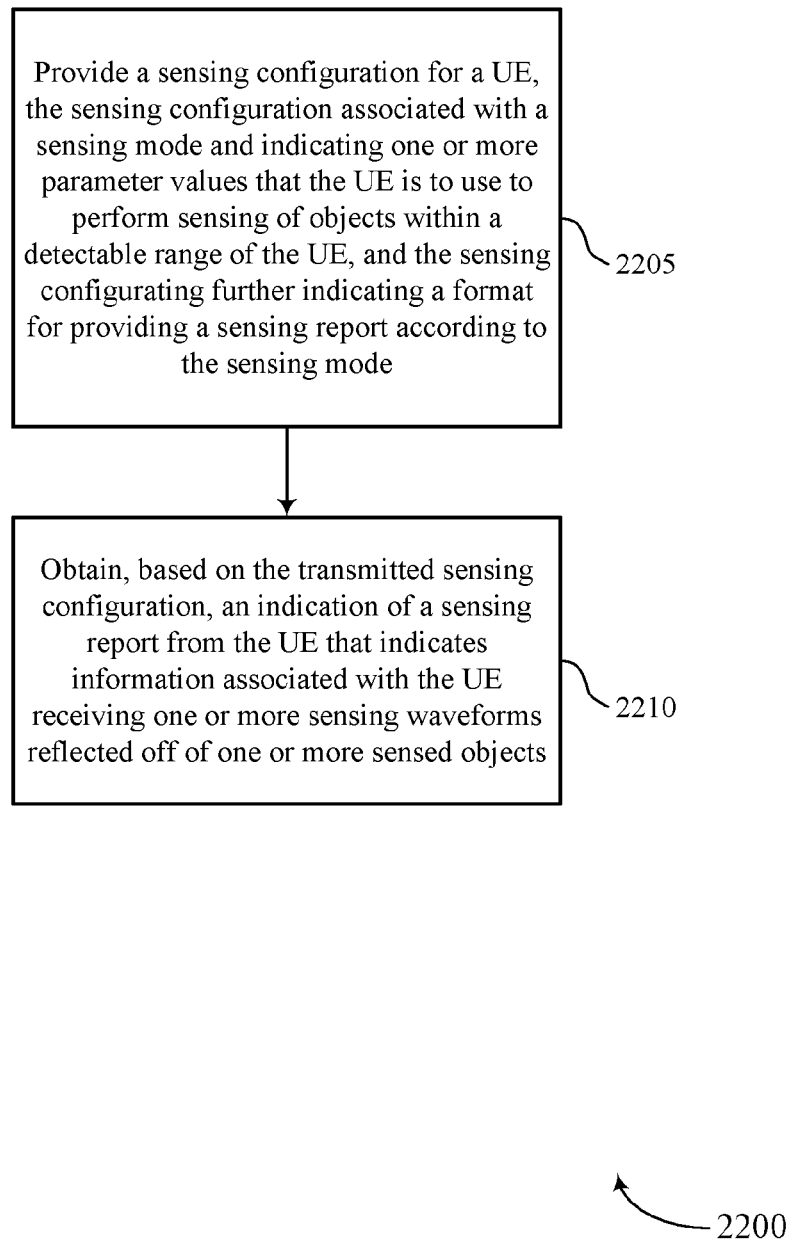

FIG. 22 shows a flowchart illustrating a method 2200 that supports sensing mode configuration for wireless sensing in accordance with aspects of the present disclosure. The operations of method 2200 may be implemented by a network entity or its components as described herein. For example, the operations of method 2200 may be performed by a communications manager as described with reference to FIGS. 16 through 19. In some examples, a network entity may execute a set of instructions to control the functional elements of the network entity to perform the functions described below. Additionally or alternatively, a network entity may perform aspects of the functions described below using special-purpose hardware.

At 2205, the network entity may provide a sensing configuration for a UE, the sensing configuration associated with a sensing mode and indicating one or more parameter values that the UE is to use to perform sensing of objects within a detectable range of the UE, and the sensing configurating further indicating a format for providing a sensing report according to the sensing mode. The operations of 2205 may be performed according to the methods described herein. In some examples, aspects of the operations of 2205 may be performed by a sensing configuration manager as described with reference to FIGS. 16 through 19.

At 2210, the network entity may obtain, based on the transmitted sensing configuration, an indication of a sensing report from the UE that indicates information associated with the UE receiving one or more sensing waveforms reflected off of one or more sensed objects. The operations of 2210 may be performed according to the methods described herein. In some examples, aspects of the operations of 2210 may be performed by a sensing report manager as described with reference to FIGS. 16 through 19.

Figure 23:
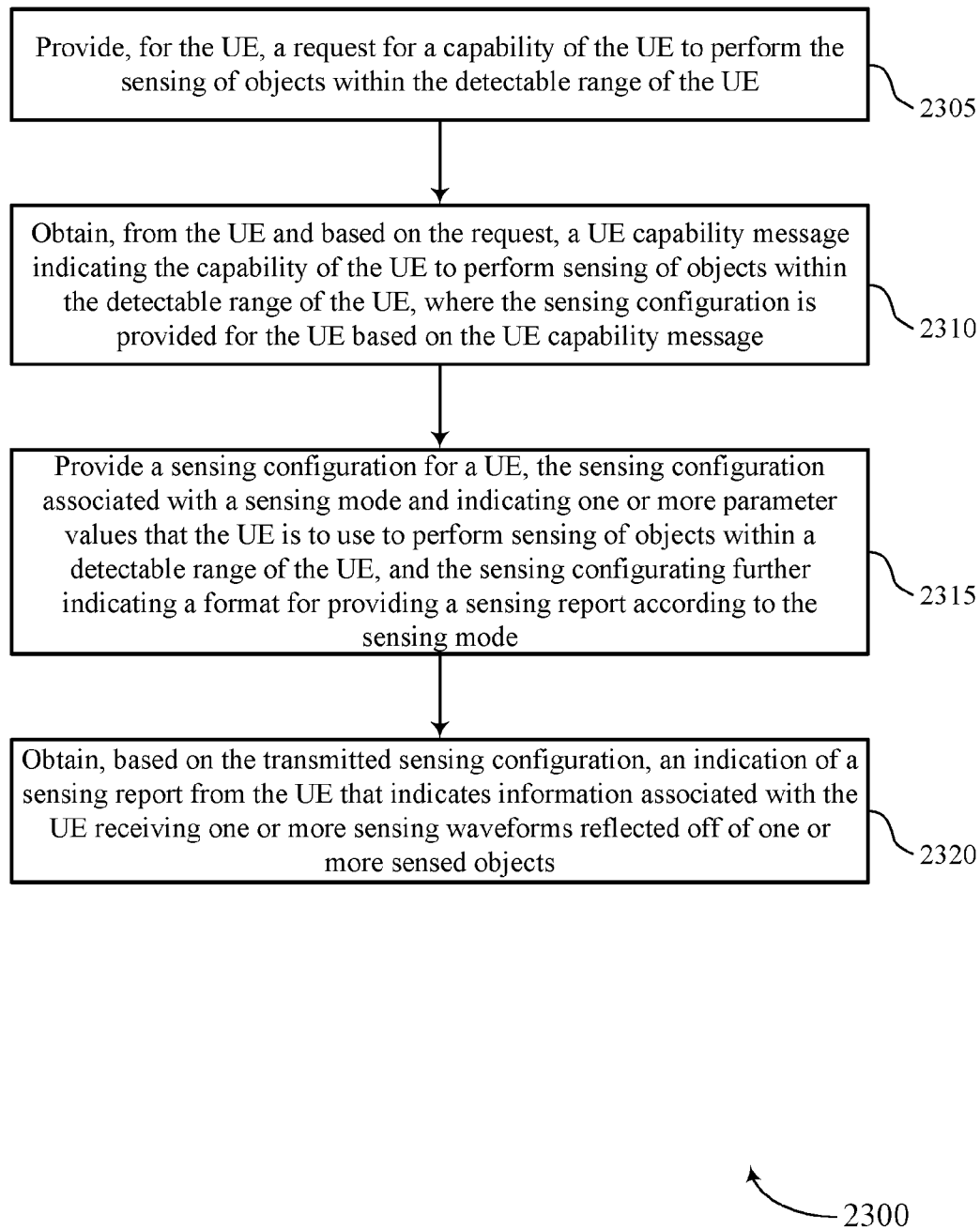

FIG. 23 shows a flowchart illustrating a method 2300 that supports sensing mode configuration for wireless sensing in accordance with aspects of the present disclosure. The operations of method 2300 may be implemented by a network entity or its components as described herein. For example, the operations of method 2300 may be performed by a communications manager as described with reference to FIGS. 16 through 19. In some examples, a network entity may execute a set of instructions to control the functional elements of the network entity to perform the functions described below. Additionally or alternatively, a network entity may perform aspects of the functions described below using special-purpose hardware.

At 2305, the network entity may provide, for the UE, a request for a capability of the UE to perform the sensing of objects within the detectable range of the UE. The operations of 2305 may be performed according to the methods described herein. In some examples, aspects of the operations of 2305 may be performed by an UE capability manager as described with reference to FIGS. 16 through 19.

At 2310, the network entity may obtain, from the UE and based on the request, a UE capability message indicating the capability of the UE to perform sensing of objects within the detectable range of the UE, where the sensing configuration is provided for the UE based on the UE capability message. The operations of 2310 may be performed according to the methods described herein. In some examples, aspects of the operations of 2310 may be performed by an UE capability manager as described with reference to FIGS. 16 through 19.

At 2315, the network entity may provide a sensing configuration for a UE, the sensing configuration associated with a sensing mode and indicating one or more parameter values that the UE is to use to perform sensing of objects within a detectable range of the UE, and the sensing configurating further indicating a format for providing a sensing report according to the sensing mode. The operations of 2315 may be performed according to the methods described herein. In some examples, aspects of the operations of 2315 may be performed by a sensing configuration manager as described with reference to FIGS. 16 through 19.

At 2320, the network entity may obtain, based on the transmitted sensing configuration, an indication of a sensing report from the UE that indicates information associated with the UE receiving one or more sensing waveforms reflected off of one or more sensed objects. The operations of 2320 may be performed according to the methods described herein. In some examples, aspects of the operations of 2320 may be performed by a sensing report manager as described with reference to FIGS. 16 through 19.

Figure 24:
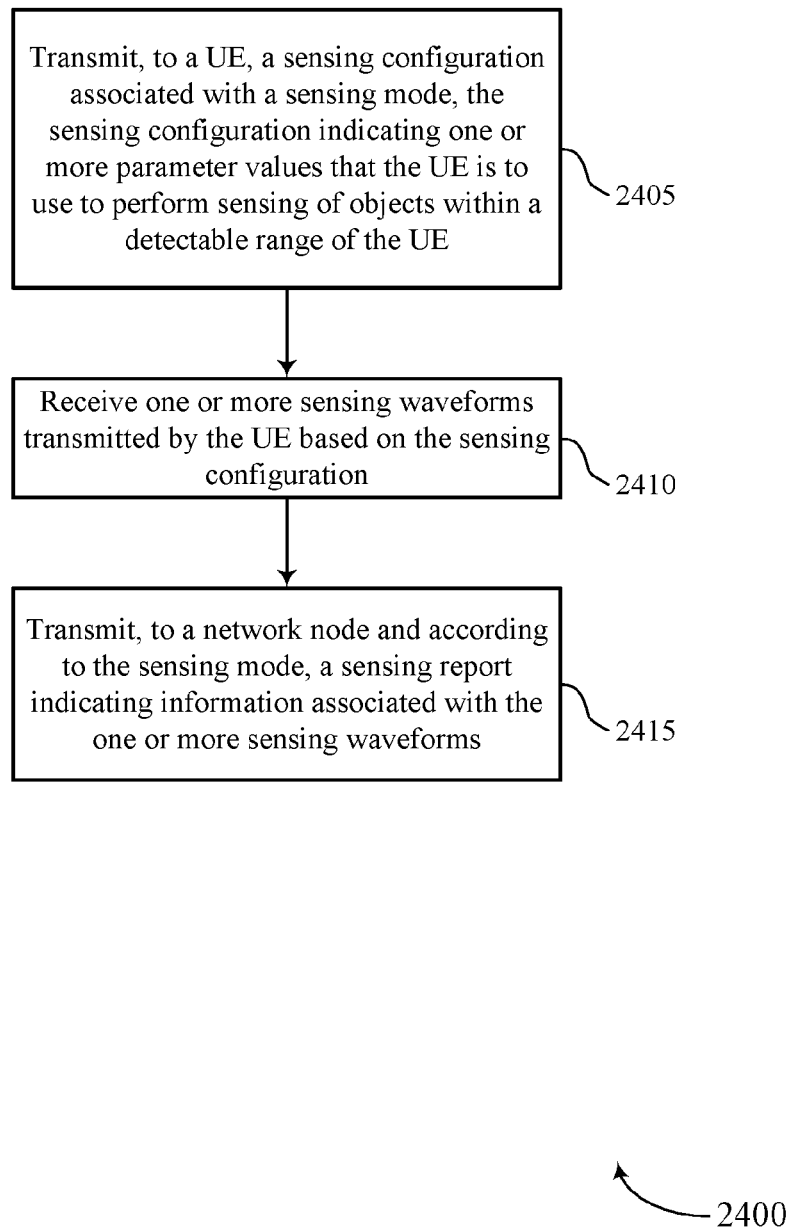

FIG. 24 shows a flowchart illustrating a method 2400 that supports sensing mode configuration for wireless sensing in accordance with aspects of the present disclosure. The operations of method 2400 may be implemented by a base station 105 or its components as described herein. For example, the operations of method 2400 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2405, the base station may transmit, to a UE, a sensing configuration associated with a sensing mode, the sensing configuration indicating one or more parameter values that the UE is to use to perform sensing of objects within a detectable range of the UE. The operations of 2405 may be performed according to the methods described herein. In some examples, aspects of the operations of 2405 may be performed by a sensing configuration manager as described with reference to FIGS. 12 through 15.

At 2410, the base station may receive one or more sensing waveforms transmitted by the UE based on the sensing configuration. The operations of 2410 may be performed according to the methods described herein. In some examples, aspects of the operations of 2410 may be performed by a sensing measurement manager as described with reference to FIGS. 12 through 15.

At 2415, the base station may transmit, to a network node and according to the sensing mode, a sensing report indicating information associated with the one or more sensing waveforms. The operations of 2415 may be performed according to the methods described herein. In some examples, aspects of the operations of 2415 may be performed by a sensing report manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at UE, comprising: receiving, from a base station, a sensing configuration associated with a sensing mode, the sensing configuration indicating one or more parameter values that the UE is to use to perform sensing of objects within a detectable range of the UE, and the sensing configurating further indicating a format for providing a sensing report according to the sensing mode; receiving one or more sensing waveforms based at least in part on the sensing configuration; and transmitting, to the base station according to the sensing mode, a sensing report indicating information associated with the one or more sensing waveforms.

Aspect 2: The method of aspect 1, further comprising: determining, based at least in part on the one or more sensing waveforms, radio frequency signal metrics associated with an object; and determining, based at least in part on the radio frequency signal metrics associated with the object, one or more properties of the object, wherein the information associated with the one or more sensing waveforms indicated in the sensing report comprises an indication of the one or more properties associated with the object.

Aspect 3: The method of any of aspects 1 through 2, further comprising: determining, based at least in part on the one or more sensing waveforms, radio frequency signal metrics associated with an object, wherein the information associated with the one or more sensing waveforms indicated in the sensing report comprises an indication of the radio frequency signal metrics.

Aspect 4: The method of aspect 3, further comprising: receiving, from the base station and based at least in part on the radio frequency signal metrics, an indication of one or more properties of the object.

Aspect 5: The method of any of aspects 1 through 4, further comprising: receiving, from the base station, a request for a capability of the UE to perform the sensing of objects within the detectable range of the UE; and transmitting, to the base station and based at least in part on the request, a UE capability message indicating the capability of the UE to perform sensing of objects within the detectable range of the UE, wherein the sensing configuration is received based at least in part on the UE capability message.

Aspect 6: The method of any of aspects 1 through 5, further comprising: transmitting, to the base station, a request for assistance information; and receiving, from the base station and based at least in part on the request, assistance information, the sensing report based at least in part on the assistance information.

Aspect 7: The method of any of aspects 1 through 6, further comprising: receiving, from the base station, a sensing result request message, wherein the sensing report is transmitted based at least in part on the sensing result request message.

Aspect 8: The method of any of aspects 1 through 7, further comprising: transmitting, to the base station, a request for object parameter information associated with one or more objects, the object parameter information based on a corresponding one or more sensing reports the base station has received from the UE, other UE, or both; and receiving, from the base station and based at least in part on the request, the object parameter information.

Aspect 9: The method of any of aspects 1 through 8, further comprising: receiving, from the base station, a sensing service request for the UE to perform sensing of objects within the detectable range of the UE, wherein the sensing configuration is received based at least in part on the sensing service request.

Aspect 10: The method of any of aspects 1 through 9, wherein the sensing configuration comprises a first sensing configuration and the sensing mode comprises a first sensing mode, the method further comprising: receiving, from the base station, a second sensing configuration associated with a second sensing mode; and switching to sensing operations according to the second sensing mode based at least in part on receiving the second sensing configuration.

Aspect 11: The method of aspect 10, wherein the first sensing mode comprises one of a UE-based sensing mode, a UE-assisted sensing mode, or a network-based sensing mode; and the second sensing mode comprises a different one of the UE-based sensing mode, the UE-assisted sensing mode, or the network-based sensing mode.

Aspect 12: The method of any of aspects 1 through 11, wherein receiving the sensing configuration from the base station is based at least in part on a sensing service request from one or more sensing management network nodes within a core network associated with the base station.

Aspect 13: A method for wireless communication at a network node, comprising: providing a sensing configuration for a UE, the sensing configuration associated with a sensing mode and indicating one or more parameter values that the UE is to use to perform sensing of objects within a detectable range of the UE, and the sensing configurating further indicating a format for providing a sensing report according to the sensing mode; and obtaining, based at least in part on the transmitted sensing configuration, an indication of a sensing report from the UE that indicates information associated with the UE receiving one or more sensing waveforms reflected off of one or more sensed objects.

Aspect 14: The method of aspect 13, wherein the information associated with the one or more sensing waveforms indicated in the sensing report comprises an indication of one or more properties of an object.

Aspect 15: The method of any of aspects 13 through 14, wherein the information associated with the one or more sensing waveforms indicated in the sensing report comprises an indication of radio frequency signal metrics associated with the one or more sensing waveforms.

Aspect 16: The method of aspect 15, further comprising: determining, based at least in part on the radio frequency signal metrics, one or more properties of an object; and providing, for the UE, an indication of one or more properties of the object.

Aspect 17: The method of any of aspects 13 through 16, further comprising: providing, for the UE, a request for a capability of the UE to perform the sensing of objects within the detectable range of the UE; and obtaining, from the UE and based at least in part on the request, a UE capability message indicating the capability of the UE to perform sensing of objects within the detectable range of the UE, wherein the sensing configuration is provided for the UE based at least in part on the UE capability message.

Aspect 18: The method of any of aspects 13 through 17, further comprising: obtaining, from the UE, a request for assistance information message; and providing, for the UE, assistance information in response to the request, the sensing report based at least in part on the assistance information.

Aspect 19: The method of any of aspects 13 through 18, further comprising: providing, for the UE, a sensing result request message, wherein the sensing report is obtained based at least in part on the sensing result request message.

Aspect 20: The method of any of aspects 13 through 19, further comprising: obtaining, from the UE, a request for object parameter information associated with one or more objects, the object parameter information based on one or more sensing reports the network node has received from the UE, other UE, or both; determining the object parameter information based at least in part on the one or more sensing reports; and providing, for the UE and based at least in part on the request, the object parameter information.

Aspect 21: The method of any of aspects 13 through 20, further comprising: providing, for the UE, a sensing service request for the UE to perform sensing of objects within the detectable range of the UE, wherein the sensing configuration is provided for the UE based at least in part on the sensing service request.

Aspect 22: The method of any of aspects 13 through 21, wherein the sensing configuration comprises a first sensing configuration and the sensing mode comprises a first sensing mode, the method further comprising: providing, for the UE, a second sensing configuration associated with a second sensing mode, wherein the UE switches to sensing operations according to the second sensing mode based at least in part on the second sensing configuration.

Aspect 23: The method of aspect 22, wherein the first sensing mode comprises one of a UE-based sensing mode, a UE-assisted sensing mode, or a network-based sensing mode; and the second sensing mode comprises a different one of the UE-based sensing mode, the UE-assisted sensing mode, or the network-based sensing mode.

Aspect 24: A method for wireless communication at a base station, comprising: transmitting, to a UE, a sensing configuration associated with a sensing mode, the sensing configuration indicating one or more parameter values that the UE is to use to perform sensing of objects within a detectable range of the UE; receiving one or more sensing waveforms transmitted by the UE based at least in part on the sensing configuration; and transmitting, to a network node and according to the sensing mode, a sensing report indicating information associated with the one or more sensing waveforms.

Aspect 25: The method of aspect 24, further comprising: determining, based at least in part on the one or more sensing waveforms, radio frequency metrics associated with an object; and determining, based at least in part on the radio frequency signal metrics associated with the object, one or more properties of the object, wherein the information associated with the one or more sensing waveforms indicated in the sensing report comprises an indication of one or more properties of the object.

Aspect 26: The method of any of aspects 24 through 25, further comprising: determining, based at least in part on the one or more sensing waveforms, radio frequency signal metrics associated with an object, wherein the information associated with the one or more sensing waveforms indicated in the sensing report comprises an indication of radio frequency signal metrics.

Aspect 27: An apparatus for wireless communication at UE, comprising a processor; memory coupled with the processor; and instructions stored in the memory and executable by the processor to cause the apparatus to perform a method of any of aspects 1 through 12.

Aspect 28: An apparatus for wireless communication at UE, comprising at least one means for performing a method of any of aspects 1 through 12.

Aspect 29: A non-transitory computer-readable medium storing code for wireless communication at UE, the code comprising instructions executable by a processor to perform a method of any of aspects 1 through 12.

Aspect 30: An apparatus for wireless communication at a network node, comprising a processor; memory coupled with the processor; and instructions stored in the memory and executable by the processor to cause the apparatus to perform a method of any of aspects 13 through 23.

Aspect 31: An apparatus for wireless communication at a network node, comprising at least one means for performing a method of any of aspects 13 through 23.

Aspect 32: A non-transitory computer-readable medium storing code for wireless communication at a network node, the code comprising instructions executable by a processor to perform a method of any of aspects 13 through 23.

Aspect 33: An apparatus for wireless communication at a base station, comprising a processor; memory coupled with the processor; and instructions stored in the memory and executable by the processor to cause the apparatus to perform a method of any of aspects 24 through 26.

Aspect 34: An apparatus for wireless communication at a base station, comprising at least one means for performing a method of any of aspects 24 through 26.

Aspect 35: A non-transitory computer-readable medium storing code for wireless communication at a base station, the code comprising instructions executable by a processor to perform a method of any of aspects 24 through 26.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at user equipment (UE), comprising:
   receiving, from a base station, a sensing configuration associated with a sensing mode, the sensing configuration indicating one or more parameter values that the UE is to use to perform sensing of objects within a detectable range of the UE, and the sensing configurating further indicating a format for providing a sensing report according to the sensing mode;
   receiving one or more sensing waveforms based at least in part on the sensing configuration;
   determining, based at least in part on the one or more sensing waveforms, radio frequency signal metrics associated with an object, wherein the information associated with the one or more sensing waveforms indicated in the sensing report comprises an indication of the radio frequency signal metrics;
   receiving, from the base station and based at least in part on the radio frequency signal metrics, an indication of one or more properties of the object; and
   transmitting, to the base station according to the sensing mode, the sensing report indicating information associated with the one or more sensing waveforms.

2. The method of claim 1, further comprising:
   determining, based at least in part on the one or more sensing waveforms, radio frequency signal metrics associated with an object; and
   determining, based at least in part on the radio frequency signal metrics associated with the object, one or more properties of the object, wherein the information associated with the one or more sensing waveforms indicated in the sensing report comprises an indication of the one or more properties associated with the object.

3. The method of claim 1, further comprising:
   receiving, from the base station, a request for a capability of the UE to perform the sensing of objects within the detectable range of the UE; and
   transmitting, to the base station and based at least in part on the request, a UE capability message indicating the capability of the UE to perform sensing of objects within the detectable range of the UE, wherein the sensing configuration is received based at least in part on the UE capability message.

4. The method of claim 1, further comprising:
   transmitting, to the base station, a request for assistance information; and
   receiving, from the base station and based at least in part on the request, assistance information, the sensing report based at least in part on the assistance information.

5. The method of claim 1, further comprising:
   receiving, from the base station, a sensing result request message, wherein the sensing report is transmitted based at least in part on the sensing result request message.

6. The method of claim 1, further comprising:
   transmitting, to the base station, a request for object parameter information associated with one or more objects, the object parameter information based on a corresponding one or more sensing reports the base station has received from the UE, other UE, or both; and
   receiving, from the base station and based at least in part on the request, the object parameter information.

7. The method of claim 1, further comprising:
   receiving, from the base station, a sensing service request for the UE to perform sensing of objects within the detectable range of the UE, wherein the sensing configuration is received based at least in part on the sensing service request.

8. The method of claim 1, wherein the sensing configuration comprises a first sensing configuration and the sensing mode comprises a first sensing mode, the method further comprising:
   receiving, from the base station, a second sensing configuration associated with a second sensing mode; and
   switching to sensing operations according to the second sensing mode based at least in part on receiving the second sensing configuration.

9. The method of claim 8, wherein:
   the first sensing mode comprises one of a UE-based sensing mode, a UE-assisted sensing mode, or a network-based sensing mode; and
   the second sensing mode comprises a different one of the UE-based sensing mode, the UE-assisted sensing mode, or the network-based sensing mode.

10. The method of claim 1, wherein:

receiving the sensing configuration from the base station is based at least in part on a sensing service request from one or more sensing management network nodes within a core network associated with the base station.

11. A method for wireless communication at a network node, comprising:
providing a sensing configuration for a user equipment (UE), the sensing configuration associated with a sensing mode and indicating one or more parameter values that the UE is to use to perform sensing of objects within a detectable range of the UE, and the sensing configurating further indicating a format for providing a sensing report according to the sensing mode;
obtaining, based at least in part on the transmitted sensing configuration, an indication of a sensing report from the UE that indicates information associated with the UE receiving one or more sensing waveforms reflected off of one or more sensed objects;
obtaining, from the UE, a request for object parameter information associated with one or more objects, the object parameter information based on one or more sensing reports the network node has received from the UE, other UE, or both;
determining the object parameter information based at least in part on the one or more sensing reports; and
providing, for the UE and based at least in part on the request, the object parameter information.

12. The method of claim 11, wherein the information associated with the one or more sensing waveforms indicated in the sensing report comprises an indication of one or more properties of an object.

13. The method of claim 11, wherein the information associated with the one or more sensing waveforms indicated in the sensing report comprises an indication of radio frequency signal metrics associated with the one or more sensing waveforms.

14. The method of claim 13, further comprising:
determining, based at least in part on the radio frequency signal metrics, one or more properties of an object; and
providing, for the UE, an indication of one or more properties of the object.

15. The method of claim 11, further comprising:
providing, for the UE, a request for a capability of the UE to perform the sensing of objects within the detectable range of the UE; and
obtaining, from the UE and based at least in part on the request, a UE capability message indicating the capability of the UE to perform sensing of objects within the detectable range of the UE, wherein the sensing configuration is provided for the UE based at least in part on the UE capability message.

16. The method of claim 11, further comprising:
obtaining, from the UE, a request for assistance information message; and
providing, for the UE, assistance information in response to the request, the sensing report based at least in part on the assistance information.

17. The method of claim 11, further comprising:
providing, for the UE, a sensing result request message, wherein the sensing report is obtained based at least in part on the sensing result request message.

18. The method of claim 11, further comprising:
providing, for the UE, a sensing service request for the UE to perform sensing of objects within the detectable range of the UE, wherein the sensing configuration is provided for the UE based at least in part on the sensing service request.

19. The method of claim 11, wherein the sensing configuration comprises a first sensing configuration and the sensing mode comprises a first sensing mode, the method further comprising:
providing, for the UE, a second sensing configuration associated with a second sensing mode, wherein the UE switches to sensing operations according to the second sensing mode based at least in part on the second sensing configuration.

20. The method of claim 19, wherein:
the first sensing mode comprises one of a UE-based sensing mode, a UE-assisted sensing mode, or a network-based sensing mode; and
the second sensing mode comprises a different one of the UE-based sensing mode, the UE-assisted sensing mode, or the network-based sensing mode.

21. A method for wireless communication at a base station, comprising:
transmitting, to a user equipment (UE), a sensing configuration associated with a sensing mode, the sensing configuration indicating one or more parameter values that the UE is to use to perform sensing of objects within a detectable range of the UE;
receiving one or more sensing waveforms transmitted by the UE based at least in part on the sensing configuration;
providing, for the UE, a second sensing configuration associated with a second sensing mode, wherein the UE switches to sensing operations according to the second sensing mode based at least in part on the second sensing configuration; and
transmitting, to a network node and according to the sensing mode, a sensing report indicating information associated with the one or more sensing waveforms.

22. The method of claim 21, further comprising:
determining, based at least in part on the one or more sensing waveforms, radio frequency metrics associated with an object; and
determining, based at least in part on the radio frequency signal metrics associated with the object, one or more properties of the object, wherein the information associated with the one or more sensing waveforms indicated in the sensing report comprises an indication of one or more properties of the object.

23. The method of claim 21, further comprising:
determining, based at least in part on the one or more sensing waveforms, radio frequency signal metrics associated with an object, wherein the information associated with the one or more sensing waveforms indicated in the sensing report comprises an indication of radio frequency signal metrics.

24. An apparatus for wireless communication at user equipment (UE), comprising:
a processor,
memory coupled with the processor; and
instructions stored in the memory and executable by the processor to cause the apparatus to:
receive, from a base station, a sensing configuration associated with a sensing mode, the sensing configuration indicating one or more parameter values that the UE is to use to perform sensing of objects within a detectable range of the UE, and the sensing configurating further indicating a format for providing a sensing report according to the sensing mode;
receive one or more sensing waveforms based at least in part on the sensing configuration;

transmit, to the base station according to the sensing mode, a sensing report indicating information associated with the one or more sensing waveforms;

receive, from the base station, a second sensing configuration associated with a second sensing mode; and switch to sensing operations according to the second sensing mode based at least in part on receiving the second sensing configuration.

25. The apparatus of claim 24, wherein the instructions are further executable by the processor to cause the apparatus to:

receive, from the base station, a request for a capability of the UE to perform the sensing of objects within the detectable range of the UE; and transmit, to the base station and based at least in part on the request, a UE capability message indicating the capability of the UE to perform sensing of objects within the detectable range of the UE, wherein the sensing configuration is received based at least in part on the UE capability message.

26. The apparatus of claim 24, wherein the instructions are further executable by the processor to cause the apparatus to:

transmit, to the base station, a request for assistance information; and receive, from the base station and based at least in part on the request, assistance information, the sensing report based at least in part on the assistance information.

27. The apparatus of claim 24, wherein the instructions are further executable by the processor to cause the apparatus to:

receive, from the base station, a sensing result request message, wherein the sensing report is transmitted based at least in part on the sensing result request message.

* * * * *